United States Patent
Henwood et al.

(10) Patent No.: US 11,646,687 B2
(45) Date of Patent: May 9, 2023

(54) ELECTRIC MOTOR CONTROL

(71) Applicant: Schneider Toshiba Inverter Europe SAS, Pacy sur Eure (FR)

(72) Inventors: Nicolas Henwood, Carrières sous Poissy (FR); Al Kassem Jebai, Vernon (FR); Vincent Ravier, Evreux (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/544,998

(22) Filed: Dec. 8, 2021

(65) Prior Publication Data
US 2022/0200499 A1 Jun. 23, 2022

(30) Foreign Application Priority Data
Dec. 21, 2020 (EP) ..................................... 20306641

(51) Int. Cl.
*H02P 23/14* (2006.01)
*H02P 23/00* (2016.01)

(52) U.S. Cl.
CPC ................ *H02P 23/0022* (2013.01)

(58) Field of Classification Search
CPC ...... H02P 23/0022; H02P 21/14; H02P 23/14; H02P 21/0017; H02P 27/08
See application file for complete search history.

(56) References Cited

U.S. PATENT DOCUMENTS

| 10,432,121 B2 | 10/2019 | Jebai et al. |
| 2005/0017669 A1* | 1/2005 | Niiranen ................ H02P 21/16 318/716 |
| 2005/0067991 A1 | 3/2005 | El-Ibiary |
| 2013/0300333 A1 | 11/2013 | Sako et al. |

FOREIGN PATENT DOCUMENTS

| EP | 3418822 A1 | 12/2018 |
| EP | 3691113 A1 | 8/2020 |

OTHER PUBLICATIONS

European Search Report and Search Opinion dated Jun. 15, 2021 for corresponding European Patent Application No. 20306641.0, 8 pages.

* cited by examiner

*Primary Examiner* — Muhammad S Islam
(74) *Attorney, Agent, or Firm* — Locke Lord LLP

(57) ABSTRACT

Examples include a method for controlling an electric motor using a variable speed drive based on input parameters of the variable speed drive. The method uses initial estimated parameters of an electric motor and measurements of the variable speed drive at operating points of the electric motor to determine accurate input parameters of the variable speed drive.

15 Claims, 9 Drawing Sheets

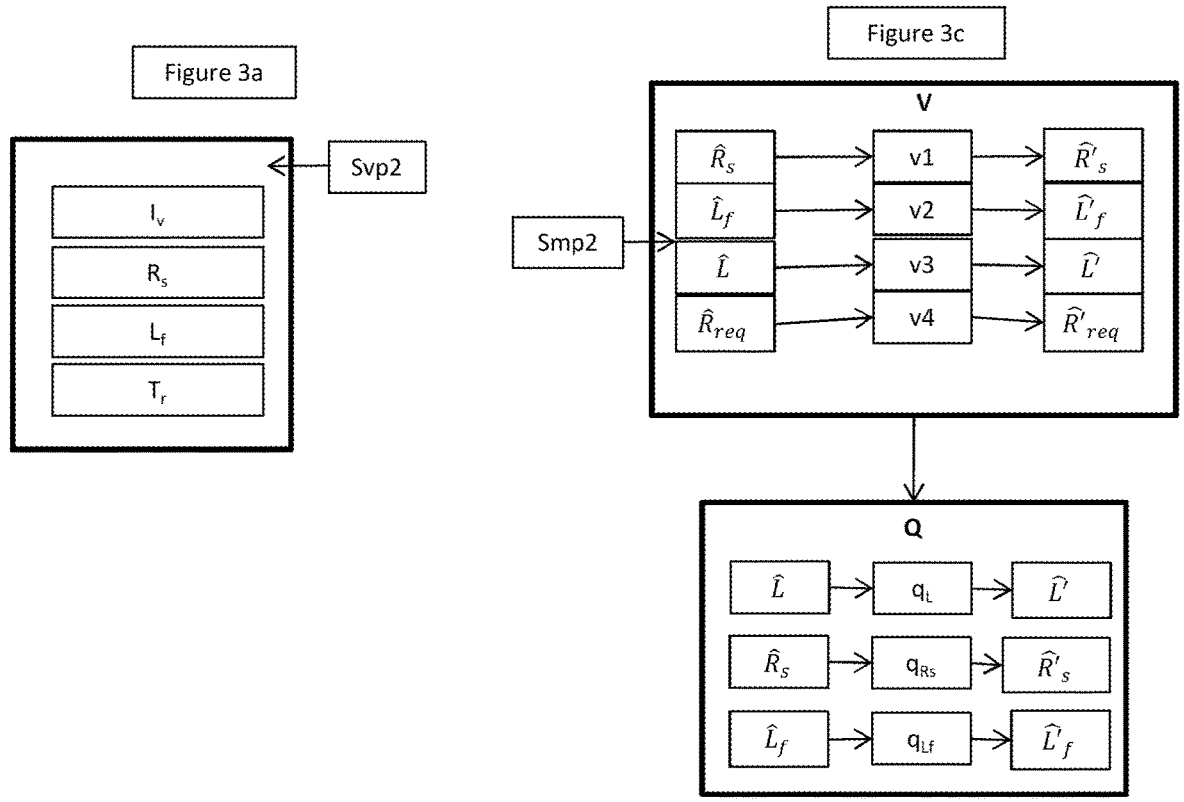
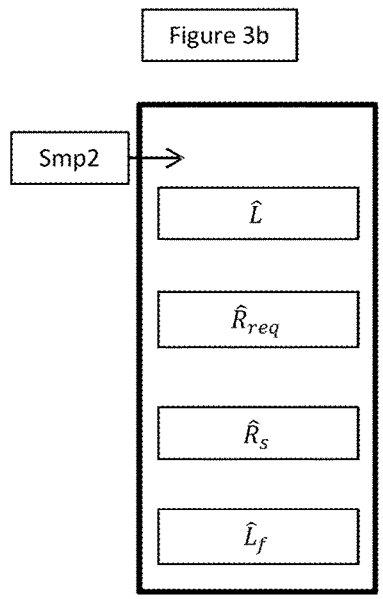
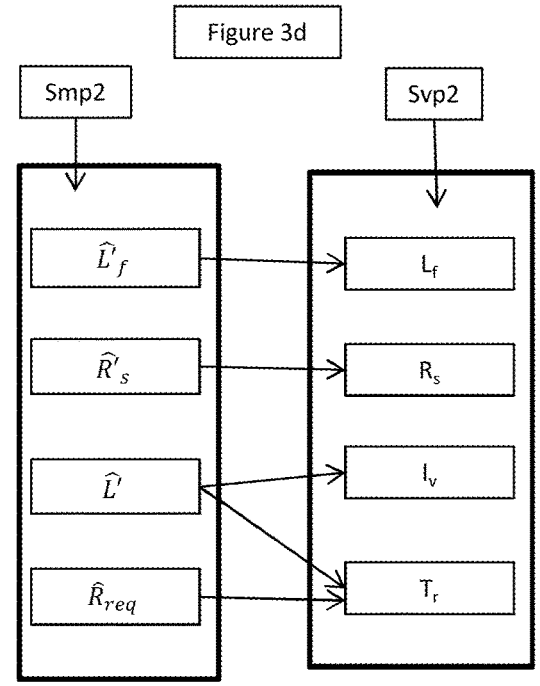

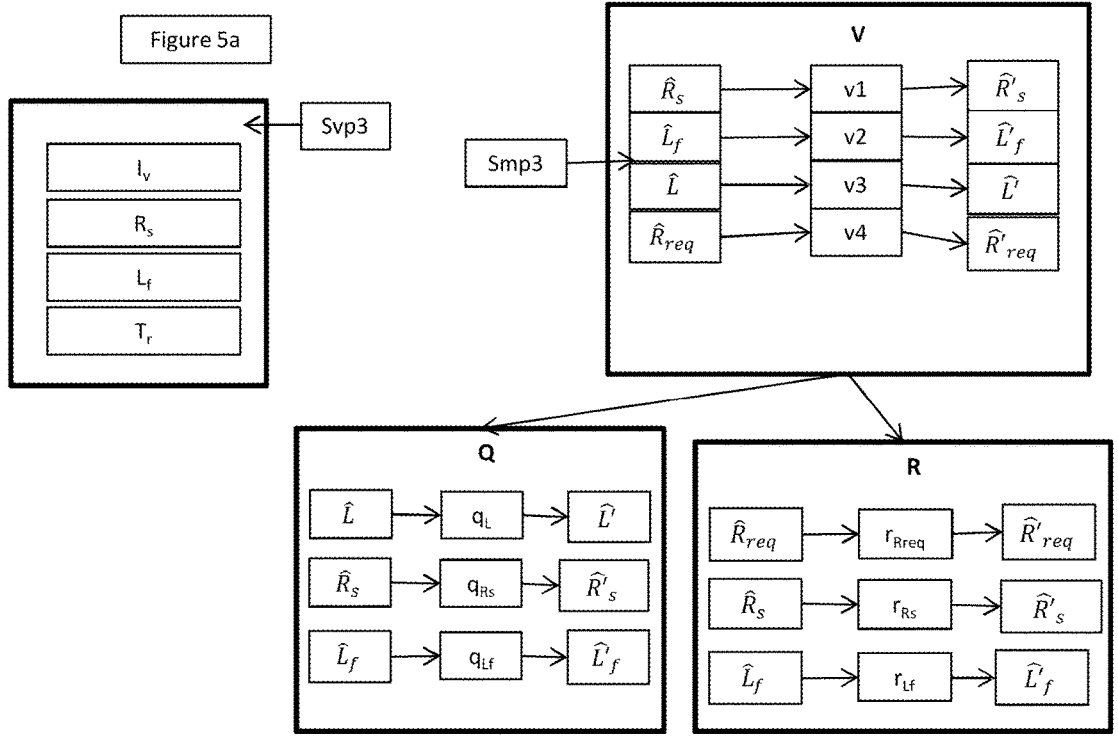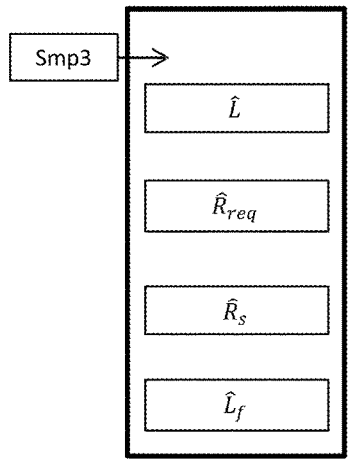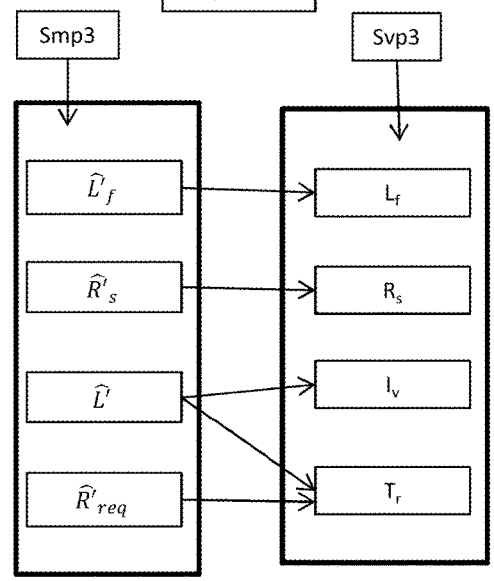

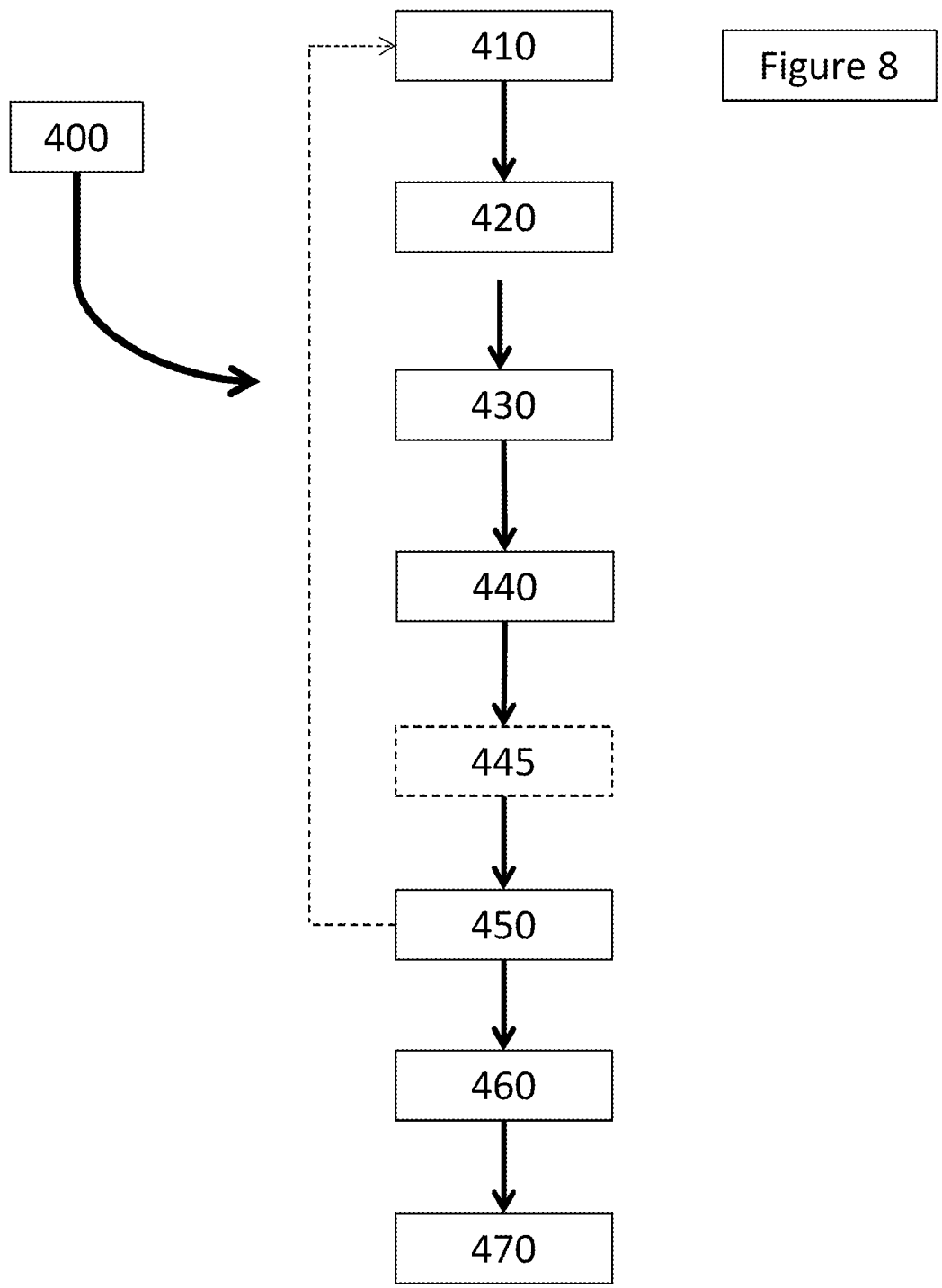

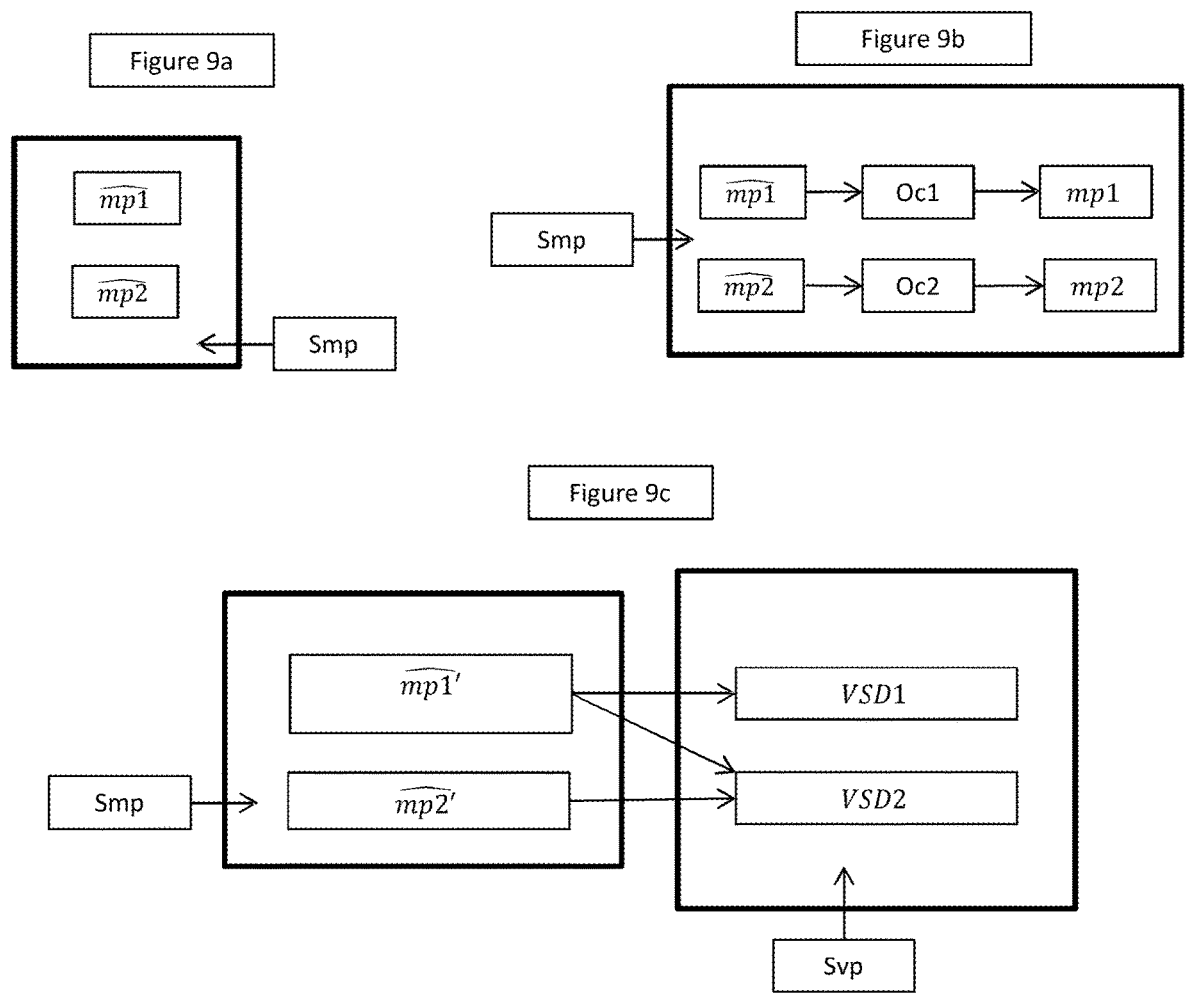

ELECTRIC MOTOR CONTROL

FIELD OF THE INVENTION

This invention relates to a method for controlling an electric motor.

BACKGROUND

Numerous electric motors are driven by variable speed drives. A variable speed drive can be set with parameters of the electric motor that the variable speed drive drives for improving the control of this electric motor.

However, setting a variable speed drive with electric motor parameters requires knowledge of the electric motor which is not always available, and when available, not necessarily accurate.

Hence, there is a need to determine and provide accurate setting parameters of an electric motor to the variable speed drive for better controlling of the electric motor.

SUMMARY

An object of the present disclosure is therefore to propose a method for controlling an electric motor using a variable speed drive which allows computing setting parameters of the variable speed drive in real time.

Another object of the present disclosure is to allow an electric motor user controlling the electric motor based on the computed settings for improving the control of the variable speed drive.

In order to reach these objects, the present disclosure proposes to determine a set of VSD parameters based on a representation model of the electric motor and on measurements of a variable speed drive controlling the electric motor. By VSD parameters, we mean input parameters of the variable speed drive controlling the electric motor. The VSD parameters may correspond to parameters of the electric motor. By representation model of the electric motor, we mean one or more equation representing a difference between initial estimated values of one or more motor parameter and real values of the one or more motor parameter at an operating point of the electric motor and one or more equation allowing determining a theoretical response of the electric motor at an operating point based on the initial estimated values of the one or more parameter. The present disclosure therefore proposes to determine refined estimated values of the motor parameters of the representation model based on measurements of the variable speed drive in order to determine a set of accurate VSD parameters for improving the control of the electric motor.

The present disclosure describes a method for controlling an electric motor using a variable speed drive, the method comprising:
- applying, by the variable speed drive, one or more electric command to the electric motor such that the electric motor runs at one or more determined operating point;
- determining, by the variable speed drive, for each determined operating point, a real operating parameter in the electric motor, based on measurements of the variable speed drive at the operating point;
- determining, by the variable speed drive, for each determined operating point, an estimated operating parameter in the electric motor based on initial estimated values of motor parameters of a representation model of the electric motor and on the electric command associated to the operating point;
- computing, for each determined operating point, an operating difference based on the real operating parameter and on the estimated operating parameter;
- determining, by the variable speed drive, for each determined operating point, a value of at least one operating coefficient, based on the operating difference and on the representation model of the electric motor;
- determining, by the variable speed drive, a refined estimated value of at least one motor parameter of the representation model based on the at least one operating coefficient determined at each operating point and on the representation model;
- determining, by the variable speed drive, values of a set of VSD parameters based on the refined estimated value of the at least one motor parameter, the set of VSD parameters comprising at least two VSD parameters.

Such a control method allows determining, in real time, a set of VSD parameters based on refined estimated values of electric motor parameters. Using the set of VSD parameters as inputs of the variable speed drive for controlling the electric motor improves the control of the electric motor. Moreover, the control method determines a set of VSD parameters adapted to each electric motor and therefore allows improving the control of numerous electric motors by the variable speed drive.

Optionally, the representation model comprises electrical or mechanical parameters of the electric motor. Such representation model allows controlling the electric motor by the variable speed drive based on electrical or mechanical aspects of the electric motor.

Optionally, the representation model is established based on a set of default parameters of the electric motor. Initializing estimated values of the motor parameters based on a set of default parameters allows increasing the precision of the determination of the VSD parameters with less operating points.

In some examples, the set of default parameters comprises a parameter of a nameplate of the electric motor. Such parameter of the nameplate allows determining initial estimated values of the motor parameters of the representation model at a start of the method based on information given by the electric motor manufacturer.

Optionally, the method further comprises updating the representation model based on the refined estimated value of at least one motor parameter determined. Updating the representation model allows refining the representation model of the electric motor during the life of the electric motor.

Optionally, the method further comprises:
- storing the values of the at least one operating coefficient into the variable speed drive when a distance between the at least one operating coefficient and previously stored at least one operating coefficient is above a determined threshold.

Such distance allows determining more accurate refined estimated values of motor parameters and by extension, more accurate values of the set of VSD parameters.

Optionally, the estimated operating parameter and the real operating parameter are respectively an estimated vector and a real vector comprising several values and the operating difference corresponds to a difference between the norms of the estimated and real vectors. This allows determining a theoretical response and a real response of the electric motor based on several values (i.e several data) which can be used to determine a representation model of the electric motor.

Optionally, the method further comprises determining a performance value of the representation model based on the values of an electric command and on an operating difference determined at an operating point. The performance value allows determining the performance of the control of the electric motor by the variable speed drive based on the current values of the motor parameters of the representation model.

Optionally, the method further comprises continuing the execution of the method when the performance value is below a determined threshold. This allows refining the set of VSD parameters if the latter was determined based on a representation model which would be less precise than desired.

Optionally, the method further comprises controlling, by the variable speed drive, the electric motor based on a set of stored VSD parameters. This allows controlling the electric motor based on a set of VSD parameters stored in the variable speed drive which may be refined by the method at each iteration.

Optionally, the set of VSD parameters comprise at least two of a stator resistance, a no-load current, a leakage inductance, a rotor time constant, a load torque and a motor inertia. These parameters may characterize numerous electric motors and therefore may be used in numerous representation models of electric motors.

Optionally, a type is assigned to the electric motor and the method further comprises storing, in a remote server, an electric motor dataset comprising the determined set of VSD parameters, the type of the electric motor and a running time of the electric motor. This allows computing statistics for each numerous electric motors controlled by a variable speed drive executing the methods presented hereby.

The present disclosure also proposes a method for processing data of electric motors comprising classifying the electric motors, based on an evolution of their set of VSD parameters during running time. This allows for example identifying some production lines associated to a VSD parameters evolution of electric motors better than the other productions lines and therefore identifying some potential issues on productions lines.

The method for processing data of electric motors also comprises determining, for a specific type of electric motor, a predicted set of VSD parameters at a determined running time, based on several datasets of electric motors comprising the specific type.

This allows for example setting an accurate set of VSD parameters for an electric motor driven by a variable speed drive which may not have access to the methods presented hereby. Moreover, determining predicted sets allows directly setting accurate VSD parameters to a variable speed drive controlling an electric motor based on the specific type and the running time of the electric motor.

The present disclosure also describes a computer-readable storage medium comprising instructions which, when executed by a processor, cause the processor to carry out any of the method hereby described.

The present disclosure also describes a variable speed drive comprising a processor adapted to control an electric motor according to any of the above method presented above.

BRIEF DESCRIPTION OF THE DRAWINGS

FIG. 3a illustrates a first example of a set of VSD parameters.

FIG. 3b illustrates a first example of a set of motor parameters of a representation model.

FIG. 3c illustrates a first example of equations of a representation model.

FIG. 3d illustrates a first example of a set of VSD parameters determined based on a set of motor parameters.

FIG. 5a illustrates a second example of a set of VSD parameters.

FIG. 5b illustrates a second example of a set of motor parameters of a representation model.

FIG. 5c illustrates a second example of equations of a representation model.

FIG. 5d illustrates a second example of a set of VSD parameters determined based on a set of motor parameters.

FIG. 8 illustrates a fourth example method.

FIG. 9a illustrates a fifth example of a set of motor parameters of a representation model.

FIG. 9b illustrates an example of links between some operating coefficients and initial and refined estimated values of a set of motor parameters.

FIG. 9c illustrates a fourth example of a set of VSD parameters determined based on a set of motor parameters.

DETAILED DESCRIPTION

The disclosure applies to control methods of an electric motor using a variable speed drive.

A variable speed drive should be understood in this disclosure as an electronic, virtual or software implemented control unit for an electric motor. A variable speed drive may control an electric motor using an electric command and in particular may apply a determined voltage to the motor. In some examples, a variable speed drive comprises a processing and control unit intended to implement a control law by taking into account, for example, an input speed set point, voltages to be applied to the electric motor during normal operation of the motor and control instructions to be applied to an inverter stage in order to obtain these output voltages. The control law may be of a vector or a scalar type. The variable speed drive may comprise a rectifier stage at an input, such rectifier stage being intended to convert an alternating voltage supplied by an electric network into a direct voltage. In some examples, a rectifier stage may be a half-wave rectifier. The variable speed drive may also comprise a direct power bus connected, on the one hand, to the rectifier stage and, on the other hand, to an inverter stage. The direct power bus can comprise two power lines connected together by at least one bus capacitor or a Zener diode configured to stabilize the voltage of the bus. The rectifier may be of a passive type such as a diode bridge or an active type based on controlled transistors. The inverter stage may be connected at the output of the direct power bus and intended to cut off the voltage supplied by the bus at a variable voltage to the electric motor. The inverter stage may comprise for example multiple switching arms each comprising controlled power transistors, for example of the IGBT type, for applying the variable voltage to the electric motor. The inverter may be controlled by, for example, a conventional technique using a PWM (Pulse Width Modulation) or Vector Control type. The control law performed by the processing unit makes it possible to determine the voltage to be applied to the output phases intended to be connected to the motor to be controlled.

An electric motor should be understood in this disclosure as any kind of electric motors which may be driven by a variable speed drive. The electric motor may be a motor controlled by an alternating voltage for example an induction motor. In some examples, the electric motor may be a synchronous electric motor or an asynchronous electric motor.

Figure 1:
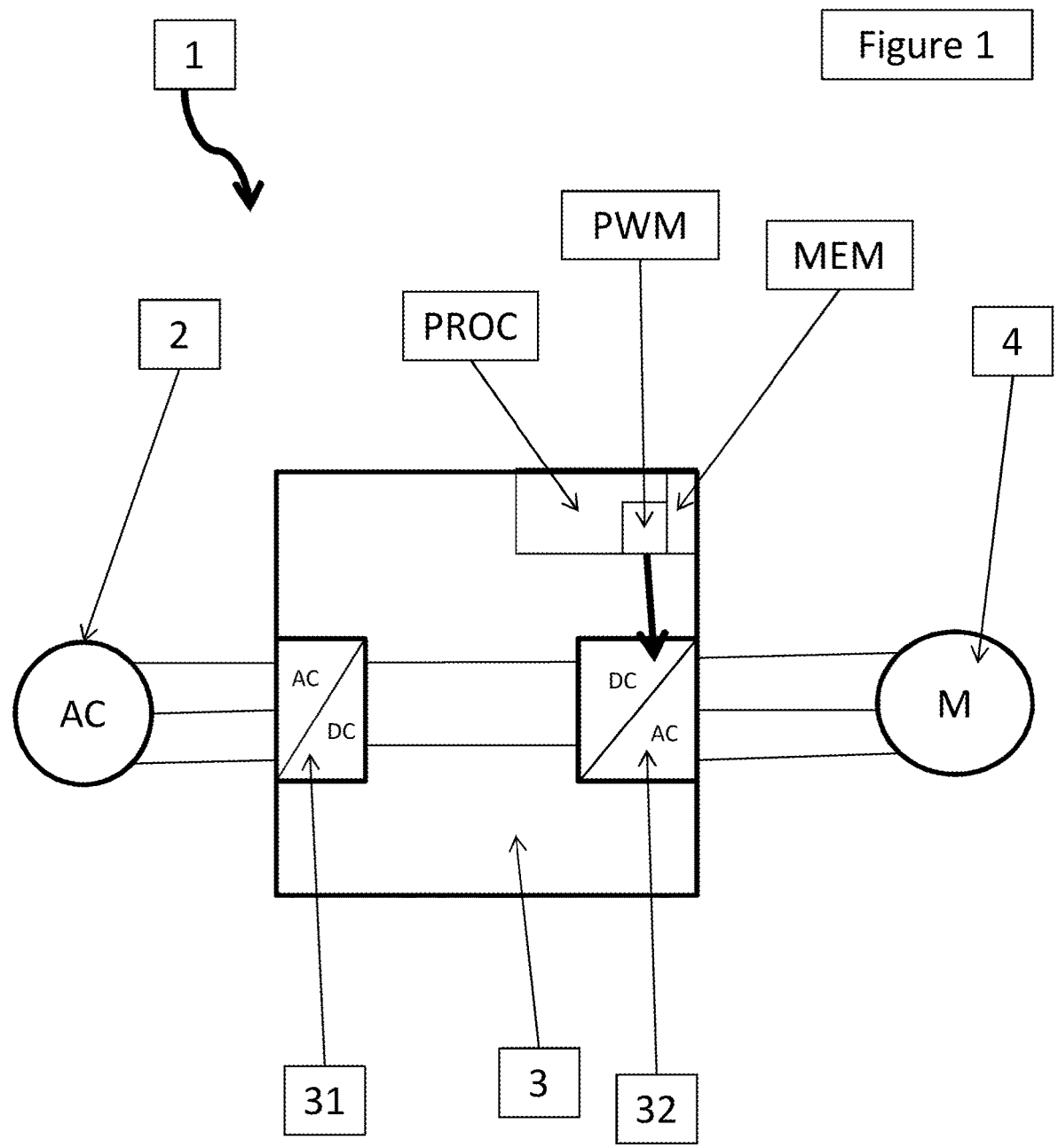
FIG. 1 illustrates an example of motor controlled by a variable speed drive.

An example of a system comprising an electric motor controlled by a variable speed drive is illustrated in FIG. 1. The system 1 comprises an electric network 2 providing a three-phase alternating voltage to a variable speed drive 3. The variable speed drive 3 comprises a rectifier stage 31 connected to the electric network 2 and converting the three-phase alternating voltage to a direct voltage. The variable speed drive also comprises an inverter stage 32 to convert the direct voltage to a controlled alternating voltage running an electric motor 4. The variable speed drive comprises a processor PROC, for example a controller or a microcontroller. The processor PROC may comprise a PWM (Pulse Width Modulation) function controlling the conversion from the direct voltage to the controlled alternating voltage. The processor PROC is configured to operate according to any of the methods hereby described. The processor PROC may comprise electronic circuits for computation managed by an operating system.

The variable speed drive 3 may comprise a non-transitory machine-readable or computer readable storage medium, such as, for example, memory or storage unit MEM, whereby the non-transitory machine-readable storage medium is encoded with instructions executable by a processor such as processor PROC, the machine-readable storage medium comprising instructions to operate processor PROC to perform as per any of the example methods hereby described. A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described. Storage or memory may include any electronic, magnetic, optical or other physical storage device that stores executable instructions as described hereby.

The variable speed drive may comprise a set of stored VSD parameters. The set of stored VSD parameters may be used to control the electric motor by the variable speed drive.

In the control methods presented below, the variable speed drive applied one or more electric command to the electric motor.

Electric Command

An electric command applied to the electric motor may comprise an electric voltage at a determined frequency. The electric voltage may be comprised between 5V and 1 kV and preferably between 300V and 600V. The determined frequency may be comprised between 10 Hz and 100 kHz and preferably between 1 kHz and 20 kHz. An electric command applied to an electric motor may drive the electric motor to run at an operating point.

Operating Point

An operating point of the electric motor may comprise a speed, an acceleration and a torque of the electric motor. A speed of the electric motor may be expressed in rotations per minute (rpm) and may be comprised between 0 and 10000 rpm and preferably between 1000 and 3000 rpm. A torque of the electric motor may be expressed in Newton-metre (Nm) and may be comprised between 0 and 10 kNm and preferably between 0 and 1000 Nm. In some examples, the torque of the electric motor corresponds to an electromagnetic torque $\tau_{em}$ of the electric motor. An operating point is reached when an electric command is applied by the variable speed drive to the electric motor.

In the control method presented below, one of the motivations of the control methods is to determine a set of VSD parameters comprising at least two VSD parameters.

VSD Parameters

A VSD parameter should be understood in this disclosure as an input parameter of the variable speed drive for controlling the electric motor.

The set of VSD parameters are determined based on refine estimated values of one or more motor parameters of a representation model.

By a refined estimated value of a motor parameter, it should be understood in the present disclosure a value of the motor parameter in the representation model determined during an iteration of the methods presented hereby.

Representation Model

By representation model of the electric motor, we mean one or more equation representing a difference between initial estimated values of one or more motor parameter and real values of the one or more motor parameter at an operating point of the electric motor and one or more equation allowing determining a theoretical response of the electric motor at an operating point based on the initial estimated values of the one or more parameter.

By an initial estimated value of a motor parameter, it should be understood in the present disclosure a value of the motor parameter in the representation model estimated at a start of an iteration of the methods presented hereby.

In the present disclosure, an initial estimated value of a motor parameter "mp" will be noted $\widehat{mp}$, a refined estimated value of the motor parameter "mp" will be noted $\widetilde{mp}'$ and a real value of the motor parameter "mp" will be noted mp.

An example of representation model of the electric motor may comprise a plurality of equations, each equation comprising at least one motor parameter of the set of motor parameters of the representation model.

In some examples, a representation model of the electric motor may comprise a main equation and a sub-equation.

By a main equation, it should be understood in this disclosure an equation comprising all the motor parameters of the set of motor parameters of the representation model.

By a sub-equation, it should be understood in this disclosure an equation comprising at least one motor parameters of the representation model. A sub-equation of the representation model may be an equation comprising one or more motor parameter of the representation model.

In some examples, for obtaining a main-equation or a sub-equation of the representation model based on another main equation of a representation model, one may apply a linear approximation of the main equation. In some examples, the main equation may be approximated using a Taylor polynomial. In some examples, a sub-equation may be determined by a projection of the main equation in a sub-space comprising less motor parameters. A sub-equation reduces the number of motor parameters in order to determinate their refine estimated values by running the electric motor with less operating points.

Examples methods will be presented for a better understanding of the claimed invention.

Example Method 100

Figure 2:
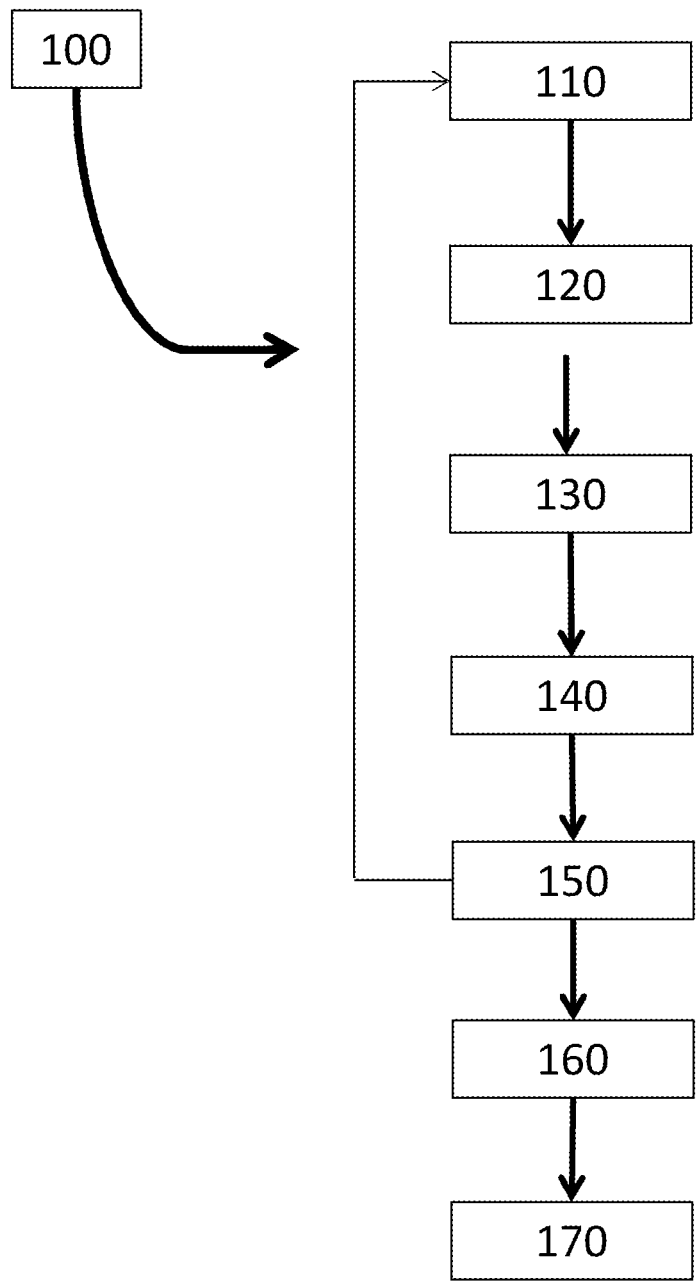
FIG. 2 illustrates a first example method.

An example method 100 is presented in reference with FIG. 2. In the example method 100, the electric motor controlled by the variable speed drive is an asynchronous motor and can be controlled by the variable speed drive in open loop. By open loop, it should be understood in the example method 100 that the variable speed drive does not measure a rotor speed $\omega_r$ of the electric motor at operating points. Hence, the variable speed drive cannot determine a real value of a slip velocity $\omega_g$ of the asynchronous motor based on the rotor speed $\omega_r$. The slip velocity $\omega_g$ corresponds to a difference between a synchronism speed $\omega_s$ and the rotor speed $\omega_r$ of the asynchronous motor.

One of the goals of the example method 100 is to determine a set of VSD parameters comprising four VSD parameters based on refined estimated values of three motor parameters and on an initial estimated value of one motor parameter of a representation model of example method 100. The four VSD parameters comprise a no-load current $I_v$, a stator resistance $R_s$, a leakage inductance $L_f$ and a rotor time constant $T_r$. An example of a set of VSD parameters Svp2 of example method 100 is illustrated in FIG. 3a.

A first equation of the representation model of example method 100 which allows determining this set of VSD parameters Svp2 is:

$$V = \left( \hat{R}_s + j\hat{L}_f \omega_s + j\hat{L}\omega_s \frac{1}{1 + j\hat{\omega}_g \frac{\hat{L}}{\hat{R}_{req}}} \right) \Delta i_{dq}$$

where:
$\hat{R}_s$ is an initial estimated value of a stator resistance (the stator resistance being a motor parameter),
$\hat{L}_f$ is an initial estimated value of a leakage inductance (the leakage inductance being a motor parameter),
$\hat{L}$ is an initial estimated value of a specific inductance (the specific inductance being a motor parameter),
$\hat{R}_{req}$ is initial an estimated value of a specific resistance (the leakage inductance being a motor parameter),
$\omega_s$ is a synchronism speed of the electric motor,
$\hat{\omega}_g$ is an estimated value of a slip velocity.
$\Delta i_{dq}$ is a current difference and corresponds to a difference between an estimated current $\hat{I}_{dq}$ in the electric motor at an operating point and a real current $I_{dq}$ determined by measurements in the electric motor at an operating point ($\Delta i_{dq} = \hat{I}_{dq} - I_{dq}$),
V is an operating coefficient representing a difference between estimated values of motor parameters ($\hat{R}_s$, $\hat{L}_f$, $\hat{L}$ and $\hat{R}_{req}$) and real values of the motor parameters ($R_s$, $L_f$, $L$, $R_{req}$) at the operating point.

The different inductances may be expressed in Henry (H). The different resistances may be expressed in ohm (Ω).

The specific inductance L may be estimated based on a mutual inductance $L_m$ and on a rotor inductance $L_r$. The specific inductance L may be equal to:

$$L = \frac{L_m^2}{L_r}$$

The leakage inductance $L_f$ may be estimated based on a mutual inductance $L_m$, a stator inductance $L_s$ and on a rotor inductance $L_r$. The leakage inductance $L_f$ may be equal to:

$$L_f = L_s - \frac{L_m^2}{L_r}$$

The specific resistance $R_{req}$ may be estimated based on a rotor resistance $R_r$, a rotor inductance $L_r$ and on a mutual inductance $L_m$. The specific resistance $R_{req}$ may be equal to:

$$R_{req} = R_r - \frac{L_m^2}{L_r^2}$$

The estimated current $\hat{I}_{dq}$ and the real current $I_{dq}$ are vectors comprising two components. A first component $I_d$ is a component of the current in the direct axis (d-axis) of the Park coordinate system. A second component $I_q$ is a component of the current in the quadratic axis (q-axis) of the Park coordinate system.

As represented by the first equation (which is a main equation), the representation model of the electric motor in example method 100 comprises four motor parameters. The four motor parameters form a set of motor parameters Smp2 as illustrated in FIG. 3b. The first equation is expressed in the Park coordinate system comprising d and q coordinates.

As represented in this equation, the value of the operating coefficient V depends on a current difference $\Delta i_{dq}$ which is a difference between an estimated current $\hat{I}_{dq}$ and a real current $I_{dq}$. The current difference $\Delta i_{dq}$ characterizes the difference between the initial estimated values ($\hat{R}_s$, $\hat{L}_f$, $\hat{L}$ and $\hat{R}_{req}$) of the set Smp2 of motor parameters of the representation model and the real values ($R_s$, $L_f$, $L$, $R_{req}$) of the motor parameters of the electric motor at an operating point.

The current difference $\Delta i_{dq}$ allows computing the refined estimated values ($\hat{R}'_s$, $\hat{L}'_f$, $\hat{L}'$ and $\hat{R}'_{req}$) of the motor parameters.

Some refined estimated values of the motor parameters may be used to determine the set Svp2 of VSD parameters as illustrated by the arrows of FIG. 3d showing which refined estimated values and which initial estimated value of the motor parameters of the set of motor parameter Smp2 are, in this example, used to determine the set of VSD parameters Svp2.

One of the goals of the example method 100 is therefore to determine the refined estimated values ($\hat{R}'_s$, $\hat{L}'_f$, $\hat{L}'$ and $\hat{R}'_{req}$) of the motor parameters of the representation model to determine the set of VSD parameters Svp2.

A second equation of the representation model may be computed from the first equation using a second order linear approximation:

$$v = v_1 \frac{\delta R_s}{\hat{R}_s} + v_2 \frac{\delta L_f}{\hat{L}_f} + v_3 \frac{\delta \frac{1}{L}}{\frac{1}{\hat{L}}} + v_4 \frac{\delta \frac{\omega_g}{R_{req}}}{\frac{\hat{\omega}_g}{\hat{R}_{req}}}$$

where:

$\delta R_s$ is a difference between the initial estimated value of the stator resistance $\hat{R}_s$ and the real value of the stator resistance $R_s$;

$\delta L_f$ is a difference between the initial estimated value of the leakage inductance $\hat{L}_f$ and the real value of the leakage inductance $L_f$;

$$\delta \frac{1}{L}$$

is a difference between the inverse of the initial estimated value of $$\frac{1}{\hat{L}}$$

of the specific inductance and the inverse of the real value $$\frac{1}{L}$$

of the specific inductance;

$$\delta \frac{\omega_g}{R_{req}}$$

is a difference between the estimated value of the slip velocity divided by the initial estimated value of the specific resistance $$\frac{\hat{\omega}_g}{\hat{R}_{req}}$$

and its real value $$\frac{\omega_g}{R_{req}}$$

at a determined operating point;

$v_1$ is an operating coefficient estimated based on initial estimated value of the stator resistance $\hat{R}_s$ and on the real current $I_{dq}$ at the determined operating point, $v_2$ is an operating coefficient estimated based on initial estimated value of the leakage inductance $\hat{L}_f$ on the synchronism speed $\omega_s$ and on the real current $I_{dq}$ at the determined operating point, $v_3$ is an operating coefficient estimated based on initial estimated values of the specific resistance $\hat{R}_{req}$, specific inductance $\hat{L}$, on the estimated value of the slip velocity $\hat{\omega}_g$, on the synchronism speed $\omega_s$ and on the real current $I_{dq}$ at the determined operating point, $v_4$ is an operating coefficient estimated based on initial estimated values of the specific resistance $\hat{R}_{req}$, specific inductance $\hat{L}$, on the estimated value of the slip velocity $\hat{\omega}_g$, on the synchronism speed $\omega_s$ and on the real current $I_{dq}$ at the determined operating point.

The second equation (which is also a main equation since the second equation comprises all the motor parameters of the set of motor parameters Smp2) of the representation model of example method 100 comprises the real values ($R_s$, $L_f$, $L$, $R_{req}$) of the motor parameters. However, the second equation of the representation model does not allow isolating a real value of the specific resistance $R_{req}$ from a real value of the slip velocity $\omega_g$ of the electric motor. As said above, in open loop, the variable speed drive does not have access to the real value of the slip velocity $\omega_g$ and therefore, the example method 100 does not allow determining a refined estimated value of the motor parameter $\hat{R}'_{req}$ without knowing the real value of the slip velocity $\omega_g$. An arrow linking the initial estimated value of the specific resistance $\hat{R}_{req}$ to the rotor time constant $T_r$ is represented in FIG. 3d, since example method 100 does not allow determining the refined estimated value of the specific resistance $\hat{R}'_{req}$. Hence, the variable speed drive will determine the rotor time constant $T_r$ based on the refined estimated value of the specific inductance $\hat{L}'$ and on the estimated value of the specific resistance $\hat{R}_{req}$. In the form of the second equation of the representation model of example method 100, the variable speed drive neither can obtain the refined estimated values of the other motor parameters ($\hat{R}'_s$, $\hat{L}'_f$, $\hat{L}'$).

The representation model of example method 100 therefore comprises a third equation (which is a sub-equation) computed from the second equation using a projection of the second equation in a sub-space:

$$Q = q_{Rs} \frac{\delta R_s}{\hat{R}_s} + q_{Lf} \frac{\delta L_f}{\hat{L}_f} + q_L \frac{\delta \frac{1}{L}}{\frac{1}{\hat{L}}}$$

where:

Q is an operating coefficient estimated based on initial estimated values of the stator resistance $\hat{R}_s$, leakage inductance $\hat{L}_f$, specific resistance $\hat{R}_{req}$, specific inductance $\hat{L}$, on the estimated value of the slip velocity $\hat{\omega}_g$, on the synchronism speed $\omega_s$ and on the current difference $\Delta i_{dq}$ at a determined operating point, $q_{Rs}$ is an operating coefficient estimated based on initial estimated values of the stator resistance $\hat{R}_s$, specific resistance $\hat{R}_{req}$, specific inductance $\hat{L}$ and on the estimated value of the slip velocity $\hat{\omega}_g$, at the determined operating point, $q_{Lf}$ is an operating coefficient estimated based on initial estimated values of the leakage inductance $\hat{L}_f$, specific resistance $\hat{R}_{req}$, specific inductance $\hat{L}$, and on the estimated value of the slip velocity $\hat{\omega}_g$ at a determined operating point, $q_L$ is an operating coefficient estimated based on the initial estimated value of specific inductance $\hat{L}$ and on the synchronism speed $\omega_s$ at a determined operating point, The third equation of the representation model of example method 100 does not comprise any term linked to the real value of the slip velocity $\omega_g$ and therefore, all the terms of the third equation are known except for the real values of the motor parameters $R_s$, $L_f$ and L. The third equation has therefore three values to be determined which are the real values of the motor parameters $R_s$, $L_f$ and L. In fact, the three values to be determined correspond to the refined estimated values ($\hat{R}'_s$, $\hat{L}'_f$, $\hat{L}'$) of the three motor parameters.

The variable speed drive permits determining in this example the refined estimated values of the motor parameters $\hat{R}'_s$, $\hat{L}'_f$ and $\hat{L}'$ based on their respective operating coefficients $q_{Rs}$, $q_{Lf}$ and $q_L$ and on the operating coefficient Q. As said above, the operating coefficients Q, $q_{Rs}$, $q_{Lf}$ and $q_L$ are linked to an operating point of the electric motor. Hence, at three different operating points, the variable speed drive determines a system of three equations with three values to be determined that the variable speed drive can solve to determine the refined estimated values of the motor parameters $\hat{R}'_s$, $\hat{L}'_f$ and $\hat{L}'$. The refined estimated values of the motor parameters $\hat{R}_s$, $\hat{L}'_f$ and $\hat{L}'$ will then be used to determine the set of VSD parameters. An example of a representation model of example method 100 is illustrated in FIG. 3c and comprises the second and third equations.

The example method 100 finding the values of the set of VSD parameters Svp2 is presented below.

As illustrated in bloc 110, the example method 100 comprises applying, by the variable speed drive, three electric commands to reach three determined operating points of the electric motor.

As illustrated in bloc 120, the example method 100 comprises determining, by the variable speed drive, for each determined operating point, a real current $I_{dq}$ based on measurements of the variable speed drive at the operating point. The real current $I_{dq}$ corresponds to the current in the electric motor at each operating point. More precisely, the real current $I_{dq}$ is determined based on three measured currents $I_1$, $I_2$ and $I_3$ corresponding to the current in each winding of the electric motor at the operating point. In some examples, a norm of the real current $I_{dq}$ is equal to:

$$|I_{dq}| = \sqrt{I_d^2 + I_q^2}$$

Where:

$|I_{dq}|$ is a norm of a real current $I_{dq}$ in the electric motor, $I_d$ is the first component of the current in the direct axis (d-axis) of the Park coordinate system and may be determined based on the measured currents in the windings of the electric motor $I_1$, $I_2$ and $I_3$, $I_q$ is the second component of the current in the quadratic axis (q-axis) of the Park coordinate system and may be determined based on the measured currents in the windings of the electric motor $I_1$, $I_2$ and $I_3$.

In the present disclosure, the different currents may be expressed in Ampere (A).

The real current $I_{dq}$ is dependent on the real values ($R_s$, $L_f$, L, $R_{req}$) of the motor parameters of the representation model since it is determined based on measurements of the variable speed drive at the operating point. The real current $I_{dq}$ is also dependent on the electric command applied to the electric motor to reach the operating point.

In example method 100, the real current $I_{dq}$ corresponds to a real operating parameter Opr associated to an operating point. The real operating parameter Opr may characterize a real response of the electric motor at the operating point determined based on measurements of the variable speed drive at the operating point.

As illustrated in bloc 130, the example method 100 comprises determining, by the variable speed drive, for each determined operating point, an estimated current $\hat{I}_{dq}$ in the electric motor.

The estimated current $\hat{I}_{dq}$ is estimated based on initial estimated values of the stator resistance $\hat{R}_s$, leakage inductance $\hat{L}_f$, specific resistance $\hat{R}_{req}$ and specific inductance $\hat{L}$ of the representation model of the electric motor and on the electric command applied to the electric motor to reach the operating point. In other words, the estimated current $\hat{I}_{dq}$, at each operating point, is estimated based on the initial estimated values of the motor parameters and on the electric command.

The estimated current $\hat{I}_{dq}$ corresponds to an estimated operating parameter Ope associated to an operating point of example method 100. The estimated operating parameter Ope may characterize a theoretical response of the electric motor at the operating point determined based on the initial estimated values of the motor parameters.

As illustrated in bloc 140, the example method 100 comprises computing, by the variable speed drive, for each determined operating point, a current difference $\Delta i_{dq}$. The current difference $\Delta i_{dq}$ corresponds to a difference between the estimated current $\hat{I}_{dq}$ in the electric motor at an operating point and a real current $I_{dq}$ in the electric motor at the operating point ($\Delta i_{dq} = \hat{I}_{dq} - I_{dq}$). The current difference $\Delta i_{dq}$ therefore represents, at an operating point, a difference between the initial estimated values ($\hat{R}_s$, $\hat{L}_f$, $\hat{L}$ and $\hat{R}_{req}$) of the set Smp2 of motor parameters of the representation model and the real values ($R_s$, $L_f$, L, $R_{req}$) of the motor parameters.

The current difference $\Delta i_{dq}$ corresponds to an operating difference Opd associated to an operating point of example method 100. The operating difference Opd represents a difference between the theoretical response and the real response of the motor at an operating point.

As illustrated in bloc 150, the example method 100 comprises determining, by the variable speed drive, for each determined operating point, a value of the operating coefficients Q, $q_{Rs}$, $q_{Lf}$, $q_L$ based on the current difference $\Delta i_{dq}$ and on the third equation of example method 100. The values of the operating coefficients are therefore estimated, at each operating point, based on the representation model of the motor and on the operating difference Opd.

At this point of the example method 100, the variable speed drive has determined a set of operating coefficients for each operating point. In some examples, a set of operating coefficients for the first operating point may be (Q1, $q1_{Rs}$, $q1_{Lf}$ and $q1_L$), a set of operating coefficients for the second operating point may be (Q2, $q2_{Rs}$, $q2_{Lf}$ and $q2_L$) and a set of operating coefficients for the third operating point may be (Q3, $q3_{Rs}$, $q3_{Lf}$ and $q3_L$). Hence, the variable speed drive obtains a system of three equations:

$$Q1 = q1_{Rs}\frac{\delta R_s}{\hat{R}_s} + q1_{Lf}\frac{\delta L_f}{\hat{L}_f} + q1_L\frac{\delta \frac{1}{L}}{\frac{1}{\hat{L}}} \quad 1)$$

$$Q2 = q2_{Rs}\frac{\delta R_s}{\hat{R}_s} + q2_{Lf}\frac{\delta L_f}{\hat{L}_f} + q2_L\frac{\delta \frac{1}{L}}{\frac{1}{\hat{L}}} \quad 2)$$

-continued $$Q3 = q3_{Rs}\frac{\delta R_s}{\hat{R}_s} + q3_{Lf}\frac{\delta L_f}{\hat{L}_f} + q3_L\frac{\delta\frac{1}{L}}{\frac{1}{\hat{L}}} \quad 3)$$

The arrow of method 100 linking the bloc 150 to the bloc 110 illustrates the fact that the variable speed drive runs in this example three times through the blocs 110-150 to determine the operating coefficients associated to each of the three determined operating points.

As illustrated in bloc 160, the example method 100 comprises determining, by the variable speed drive, the refined estimated values of the stator resistance $\hat{R}'_s$, leakage inductance $\hat{L}'_f$ and specific inductance $\hat{L}'$. The refined estimated values of the motor parameters ($\hat{R}'_s$, $\hat{L}'_f$ and $\hat{L}'$) are determined based on the set of operating coefficients determined at each operating point and on the third equation. By solving the system above, the variable speed drive is in a position to determine the refined estimated values of the stator resistance $\hat{R}'_s$, leakage inductance $\hat{L}'_f$ and specific inductance $\hat{L}'$, which thereby become «known» to the VSD. In some examples, a matrix can be used to determine the real values of the motor parameters:

$$\begin{pmatrix} q1_{Rs} & q1_{Lf} & q1_L \\ q2_{Rs} & q2_{Lf} & q2_L \\ q3_{Rs} & q3_{Lf} & q3_L \end{pmatrix} \begin{pmatrix} w \\ x \\ y \end{pmatrix} = \begin{pmatrix} Q_1 \\ Q_2 \\ Q_3 \end{pmatrix}$$

where w corresponds to $$\frac{\delta R_s}{\hat{R}_s} = \frac{\hat{R}_s - R_s}{\hat{R}_s},$$

x corresponds to $$\frac{\delta L_f}{\hat{L}_f} = \frac{\hat{L}_f - L_f}{\hat{L}_f},$$

and
y corresponds to $$\frac{\delta\frac{1}{L}}{\frac{1}{\hat{L}}} = \frac{\frac{1}{\hat{L}} - \frac{1}{L}}{\frac{1}{\hat{L}}}.$$

The variable speed drive can therefore determine the refined estimated values of the stator resistance $\hat{R}'_s$, leakage inductance $\hat{L}'_f$ and specific inductance $\hat{L}'$ as being equal to the real values of the stator resistance $R_s$, leakage inductance $L_f$, and of specific inductance L which can be determined, for example by a matrix inversion, and by computing w, x and y. Actually, we cannot know if the values that we are determining are the real values of the motor parameters because of the imperfectability of the measurements, of the different approximations to determine the equations of the representation model and on the computing of the different coefficients. It is why the present disclosure uses the terminology of "refined estimated values" which represents values closer to the real values of the motor parameters than the initial estimated values of the motor parameters.

The representation model of the electric motor of example method 100 requires three operating points to determine the refined estimated values of the stator resistance $\hat{R}'_s$, leakage inductance $\hat{L}'_f$ and specific inductance $\hat{L}'$. It is however possible to have more than three operating points, for example n operating points (with n>3), and obtaining a system with n equations for three values ($\hat{R}'_s$, $\hat{L}'_f$, $\hat{L}'$) to be determined, whereby n is greater than three, n being a natural integer. In other words, to determine the refined estimated values of the stator resistance $\hat{R}'_s$, leakage inductance $\hat{L}'_f$ and specific inductance $\hat{L}'$, the example method 100 requires at least three operating points. When having more than three equations (n>3), the system of n equations with three values to be determined would not have any solution. Hence, the variable speed drive may determine the refined estimated values of the stator resistance $\hat{R}'_s$, leakage inductance $\hat{L}'_f$ and specific inductance $\hat{L}'$ by a recursive least-squares algorithm. More generally, the variable speed drive may determine the refined estimated values based on a linear regression model.

As illustrated in bloc 170, the example method 100 comprises determining, by the variable speed drive, four values of the set of VSD parameters Svp2 based on the refined estimated values of the stator resistance $\hat{R}'_s$, leakage inductance $\hat{L}'_f$ and specific inductance $\hat{L}'$ and on the initial estimated value of the specific resistance $\hat{R}_{req}$. This bloc is illustrated in FIG. 3*d*. The refined estimated value of the leakage inductance $\hat{L}'_f$ of the motor parameters allows directly determining the leakage inductance $L_f$ of the set of VSD parameters. The refined estimated value of the stator resistance $\hat{R}'_s$ of the motor parameters allows directly determining the stator resistance $R_s$ of the set of VSD parameters.

The refined estimated value of the specific inductance $\hat{L}'$ of the motor parameters allows indirectly determining the no-load current $I_v$ of the set of VSD parameters Svp2. The refined estimated value of the specific inductance $\hat{L}'$ also allows indirectly determining the rotor time constant $T_r$ which is also estimated based on the initial estimated value of the specific resistance $\hat{R}_{req}$.

By directly determining, we mean here that the value of the VSD parameter is directly equal to the refined estimated value of the motor parameter. By indirectly determining, we mean here that the value of the VSD parameter may be determined based on the refined estimated value of the motor parameter.

The example method 100 allows improving the control of an electric motor using a variable speed drive by determining values of a set of VSD parameters in open loop. The values of the set of VSD parameters are determined based on the refined estimated values of the electrical parameters of the electric motor which are closer to the real values of the motor parameter than the initial estimated values.

Example Method 200

Figure 4:
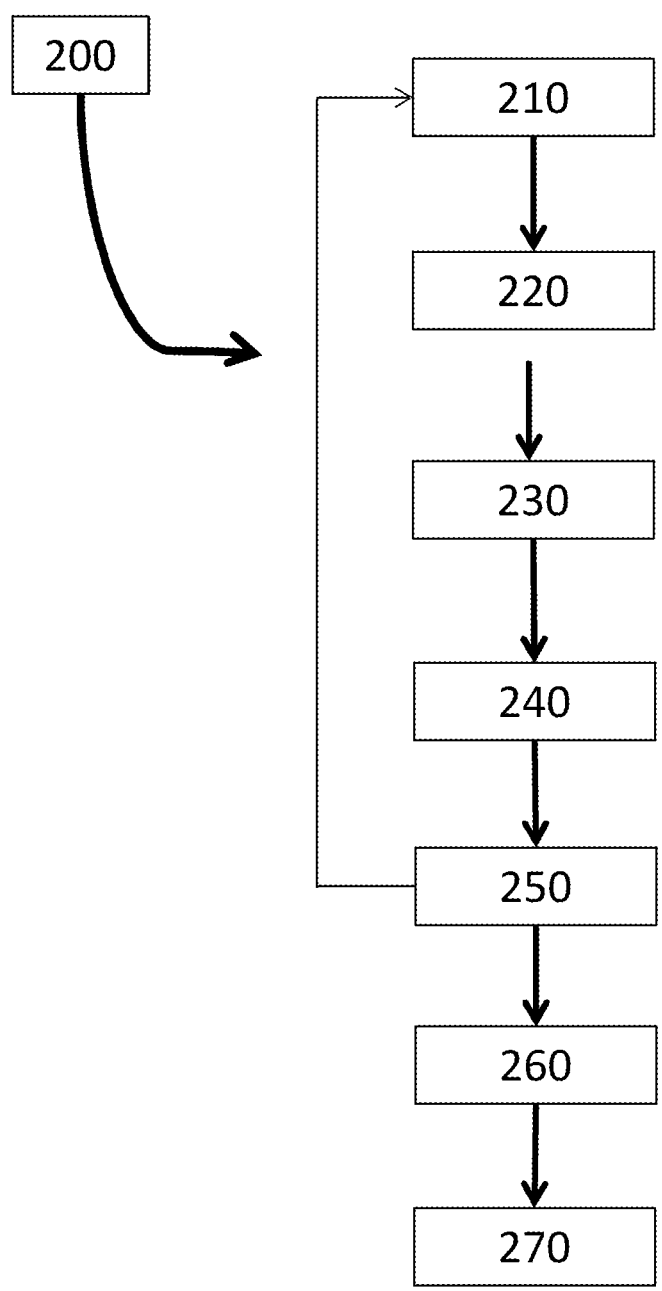
FIG. 4 illustrates a second example method.

An example method 200 is presented in reference with FIG. 4. In the example method 200, the electric motor controlled by the variable speed drive is an asynchronous motor and can be controlled by the variable speed drive in closed loop. By closed loop, it should be understood in the example method 200 that the variable speed drive measures a rotor speed $\omega_r$ of the asynchronous motor at operating points. Hence, the variable speed drive can determine a real value of a slip velocity $\omega_g$ of the asynchronous motor based on the rotor speed $\omega_r$. That is, the variable speed drive measures a rotor speed $\omega_r$ of the electric motor at operating points.

One of the goals of the example method 200 is to determine a set of VSD parameters comprising four VSD parameters based on refined estimated values of four motor parameters of a representation model of example method 200. The four VSD parameters comprise a no-load current $I_v$, a rotor time constant $T_r$, a stator resistance $R_s$ and a leakage inductance $L_f$. An example of a set of VSD parameters Svp3 of example method 200 is illustrated in FIG. 5a. The set of VSD parameters Svp3 comprises the same parameters as the set of VSD parameters Svp2.

A first equation of the representation model of example method 200 which allows determining this set of VSD parameters Svp3 is:

$$V = \left( \hat{R}_s + j\hat{L}_f \omega_s + j\hat{L}\omega_s \frac{1}{1 + j\omega_g \frac{\hat{L}}{\hat{R}_{req}}} \right) \Delta i_{dq}$$

where the first equation of the representation model of example method 200 is similar to the first equation of the representation model of example method 100 except for the value of the estimated slip velocity $\hat{\omega}_g$ which is no more an estimated value but a real value of the slip velocity $\omega_g$ that the variable speed drive can compute because of the electric motor control in closed loop. The representation model of example method 200 therefore comprises a set of motor parameters Smp3 of four motor parameters as illustrated in FIG. 5b.

A second equation of the representation model of example method 200 may be computed from the first equation based on a second order linear approximation:

$$V = v_1 \frac{\delta R_s}{\hat{R}_s} + v_2 \frac{\delta L_f}{\hat{L}_f} + v_3 \frac{\delta \frac{1}{L}}{\frac{1}{\hat{L}}} + v_4 \frac{\delta \frac{1}{R_{req}}}{\frac{1}{\hat{R}_{req}}}$$

where the second equation of the representation model of example method 200 is similar to the second equation of the representation model of example method 100 except for the last term since the variable speed drive can compute the real value of the slip velocity $\omega_g$ at each operating point.

The operating coefficients v1 and v2 of the second equation of example method 200 are estimated based on the same values as the second equation of example method 100. Regarding the operating coefficients V, v3 and v4 of the second equation of example method 200, they are also estimated based on the same values as the second equation of example method 100 except that the estimated value $\hat{\omega}_g$ of the slip velocity is replaced by the real value $\omega_g$ of the slip velocity.

In the example 200, the variable speed drive having access to the real value of the slip velocity $\omega_g$ may therefore determine the real value of the motor parameter $R_{req}$.

The representation model of example method 200 comprises a third equation (which is a sub-equation) computed from the second equation based on a projection of the second equation of example method 200 in a sub-space:

$$Q = q_{Rs} \frac{\delta R_s}{\hat{R}_s} + q_{Lf} \frac{\delta L_f}{\hat{L}_f} + q_L \frac{\delta \frac{1}{L}}{\frac{1}{\hat{L}}}$$

where the third equation of the representation model of example method 200 is similar to the third equation of the representation model of example method 100. The same references apply to the same objects.

The operating coefficient $q_L$ of the third equation of example method 200 is obtained based on the same values as the third equation of example method 100. Regarding the operating coefficients, Q, $q_{Rs}$, $q_{Lf}$ of the third equation of example method 200, they are also estimated based on the same values as the third equation of example method 100 except that the estimated value $\hat{\omega}_g$ of the slip velocity is replaced by the real value $\omega_g$ of the slip velocity.

In some examples, the operating coefficient Q may be equal to:

$$Q = \frac{T_1 E_q + T_2 E_d}{|I_{dq}|^2}$$

Where:

$$T_1 = \omega_g \frac{\hat{L}}{\hat{R}_{req}} i_q + i_d$$

$$T_2 = \omega_g \frac{\hat{L}}{\hat{R}_{req}} I_d - I_q,$$

$$E_d = v_d - v_q \omega_g \frac{\hat{L}}{\hat{R}_{req}} - $$

$$\left( \frac{\hat{R}_s}{\hat{L}_f} - \omega_g \frac{\hat{L}}{\hat{R}_{req}} \omega_s \right) \hat{L}_f \Delta i_d + \left( \omega_s + \omega_g \frac{\hat{L}}{\hat{R}_{req}} \frac{\hat{R}_s}{\hat{L}_f} + \frac{\hat{L}}{\hat{L}_f} \omega_s \right) \hat{L}_f \Delta i_q$$

$$E_q = v_q + v_d \omega_g \frac{\hat{L}}{\hat{R}_{req}} - \left( \frac{\hat{R}_s}{\hat{L}_f} - \omega_g \frac{\hat{L}}{\hat{R}_{req}} \omega_s \right) \hat{L}_f \Delta i_q - $$

$$\left( \omega_s + \omega_g \frac{\hat{L}}{\hat{R}_{req}} \frac{\hat{R}_s}{\hat{L}_f} + \frac{\hat{L}}{\hat{L}_f} \omega_s \right) \hat{L}_f \Delta i_d$$

$$\Delta i_d = \hat{I}_d - I_d, \text{ and}$$

$$\Delta i_q = \hat{I}_q - I_q.$$

In some examples, the operating coefficient $q_{Rs}$ may be equal to:

$$q_{Rs} = 2\hat{R}_s \omega_g \frac{\hat{L}}{\hat{R}_{req}}$$

In some examples, the operating coefficient $q_{Lf}$ may be equal to:

$$q_{Lf} = \hat{L}_f \omega_s \left[1 - \left(\omega_g \frac{\hat{L}}{\hat{R}_{req}}\right)^2\right]$$

In some examples, the operating coefficient $q_L$ may be equal to:

$$q_L = -\hat{L}\omega_s$$

By computing the real value $\omega_g$ of the slip velocity at the operating points, the representation model of example method 200 also comprises a fourth equation (which is also a sub-equation) computed from the second equation based on a projection of the second equation in a sub-space:

$$R = r_{Rs}\frac{\delta R_s}{\hat{R}_s} + r_{Lf}\frac{\delta L_f}{\hat{L}_f} + r_{Rreq}\frac{\delta \frac{1}{R_{req}}}{\frac{1}{\hat{R}_{req}}}$$

where:
- R is an operating coefficient estimated based on initial estimated values of the stator resistance $\hat{R}_s$, leakage inductance $\hat{L}_f$, specific resistance $\hat{R}_{req}$, specific inductance $\hat{L}$, on the synchronism speed $\omega_s$, on the real value of the slip velocity $\omega_g$ and on the current difference $\Delta i_{dq}$ at a determined operating point,
- $r_{Rs}$ is an operating coefficient estimated based on initial estimated values of the stator resistance $\hat{R}_s$, specific resistance $\hat{R}_{req}$, specific inductance $\hat{L}$ and on the real value of the slip velocity $\omega_g$ at a determined operating point,
- $r_{Lf}$ is an operating coefficient estimated based on initial estimated values of the leakage inductance $\hat{L}_f$, specific resistance $\hat{R}_{req}$, specific inductance $\hat{L}$, on the real value of the slip velocity $\omega_g$ and on the synchronism speed $\omega_s$ at a determined operating point,
- $r_{Rreq}$ is an operating coefficient estimated based on initial estimated values of the specific resistance $\hat{R}_{req}$, specific inductance $\hat{L}$, on the real value of the slip velocity $\omega_g$ and on the synchronism speed $\omega_s$ at a determined operating point.

In some examples, the operating coefficient R may be equal to:

$$R = \frac{T_1 E_d + T_2 E_q}{|I_{dq}|^2}$$

where T1, $E_d$, T2, $E_q$ correspond to the same expression as presented for the operating coefficient Q above.

In some examples, the operating coefficient $r_{Rs}$ may be equal to:

$$r_{Rs} = \hat{R}_s\left[1 - \left(\omega_g \frac{\hat{L}}{\hat{R}_{req}}\right)^2\right]$$

In some examples, the operating coefficient $r_{Lf}$ may be equal to:

$$r_{Lf} = -2\hat{L}_f \omega_s \omega_g \frac{\hat{L}}{\hat{R}_{req}}$$

In some examples, the operating coefficient $r_{Rreq}$ may be equal to:

$$r_{Rreq} = \hat{L}\omega_s \omega_g \frac{\hat{L}}{\hat{R}_{req}}$$

An example of a representation model of example method 200 is illustrated in FIG. 5c and comprises the second, third and fourth equations.

The variable speed drive knows all the terms of the third equation except the real values of the stator resistance $R_s$, leakage inductance $L_f$ and specific inductance L, and knows all the terms of the fourth equation except the real values of the stator resistance $R_s$, leakage inductance $L_f$ and specific resistance $R_{req}$. Since both real values of the stator resistance $R_s$, leakage inductance $L_f$ are comprised in the third and fourth equations of the representation model of example method 200, the two equations comprises four refined estimated values ($\hat{R}'_s$, $\hat{L}'_f$, $\hat{L}'$, $\hat{R}'_{req}$) to be determined.

Hence, the variable speed drive uses in this example two operating points to determine a system of four equations with four values to be determined, system which the variable speed drive solves to determine the refined estimated values of the stator resistance $\hat{R}'_s$, leakage inductance $\hat{L}'_f$, specific inductance $\hat{L}'$ and specific resistance $\hat{R}'_{req}$.

The example method 200 finding the values of the set of VSD parameters Svp3 is presented below.

As illustrated in bloc 210, the example method 200 comprises applying, by the variable speed drive, two electric commands to reach two determined operating points.

As illustrated in bloc 220, the example method 200 comprises determining, by the variable speed drive, for each determined operating point, a real current $I_{dq}$ and a real value of the slip velocity $\omega_g$ based on measurements of the variable speed drive at the operating point.

The slip velocity $\omega_g$ is determined based on a measure of the rotor speed $\omega_r$ of the electric motor at the determined operating point.

The real current $I_{dq}$ corresponds to the current in the electric motor at each operating point and is determined by the variable speed drive based on three measured currents $I_1$, $I_2$ and $I_3$ corresponding to the current in each winding of the electric motor as presented above for the example method 100.

In some examples, a norm of the real current $I_{dq}$ is equal to:

$$|I_{dq}| = \sqrt{I_d^2 + I_q^2}$$

Where:
- $|I_{dq}|$ is a norm of a real current $I_{dq}$ in the electric motor,
- $I_d$ is a component of the current in the direct axis (d-axis) of the Park coordinate system and may be determined based on the measured currents in the windings of the electric motor $I_1$, $I_2$ and $I_3$,
- $I_q$ is a component of the current in the quadratic axis (q-axis) of the Park coordinate system and may be determined based on the measured currents in the windings of the electric motor $I_1$, $I_2$ and $I_3$.

The real current $I_{dq}$ is dependent on the real values of the motor parameters of the representation model since it is determined based on measurements of the variable speed drive at the operating point. The real current $I_{dq}$ is also dependent on the electric command applied to the electric motor to reach the operating point. The real current $I_{dq}$ corresponds to a real operating parameter Opr associated to an operating point of the example method 200.

As illustrated in bloc 230, the example method 200 comprises determining, by the variable speed drive, for each determined operating point, an estimated current $\hat{I}_{dq}$ in the electric motor.

The estimated current $\hat{I}_{dq}$ is estimated based on initial estimated values of the stator resistance $\hat{R}_s$, leakage inductance $\hat{L}_f$, specific resistance $\hat{R}_{req}$, specific inductance $\hat{L}$ of the representation model of the electric motor and on the electric command applied to the electric motor to reach the operating point. The estimated current $\hat{I}_{dq}$ corresponds to an estimated operating parameter Ope associated to an operating point of the example method 200.

As illustrated in bloc 240, the example method 200 comprises computing, by the variable speed drive, for each determined operating point, a current difference $\Delta i_{dq}$. The current difference $\Delta i_{dq}$ corresponds to a difference between the estimated current $\hat{I}_{dq}$ in the electric motor at an operating point and the real current $I_{dq}$ measured in the electric motor at the operating point ($\Delta i_{dq} = \hat{I}_{dq} - I_{dq}$). The current difference $\Delta i_{dq}$ corresponds to an operating difference Opd associated to an operating point of the example method 200.

As illustrated in bloc 250, the example method 200 comprises determining, by the variable speed drive, for each determined operating point, a value of the operating coefficients Q, $q_{Rs}$, $q_{Lf}$, $q_L$, R, $r_{Rs}$, $r_{Lf}$, $r_{Rreq}$, based on the current difference $\Delta i_{dq}$ and on the third and fourth equations. The values of the operating coefficients are therefore estimated, at each operating point, based on the representation model of the motor and on the operating difference Opd.

At this point, the variable speed drive has determined a set of operating coefficients for each operating point. In some examples, a set of operating coefficients for the first operating point may be (Q1, $q1_{Rs}$, $q1_{Lf}$, $q1_L$, R1, $r1_{Rs}$, $r1_{Lf}$ and $r1_{Rreq}$), and a set of operating coefficients for the second operating point may be (Q2, $q2_{Rs}$, $q2_{Lf}$, $q2_L$, R2, $r2_{Rs}$, $r2_{Lf}$ and $r2_{Rreq}$). Hence, the variable speed drive obtains a system of four equations:

$$Q1 = q1_{Rs}\frac{\delta R_s}{\hat{R}_s} + q1_{Lf}\frac{\delta L_f}{\hat{L}_f} + q1_L\frac{\delta \frac{1}{L}}{\frac{1}{\hat{L}}} \quad 1)$$

$$R1 = r1_{Rs}\frac{\delta R_s}{\hat{R}_s} + r1_{Lf}\frac{\delta L_f}{\hat{L}_f} + r1_{Rreq}\frac{\delta \frac{1}{R_{req}}}{\frac{1}{\hat{R}_{req}}} \quad 2)$$

$$Q2 = q2_{Rs}\frac{\delta R_s}{\hat{R}_s} + q2_{Lf}\frac{\delta L_f}{\hat{L}_f} + q2_L\frac{\delta \frac{1}{L}}{\frac{1}{\hat{L}}} \quad 3)$$

$$R2 = r2_{Rs}\frac{\delta R_s}{\hat{R}_s} + r2_{Lf}\frac{\delta L_f}{\hat{L}_f} + r2_{Rreq}\frac{\delta \frac{1}{R_{req}}}{\frac{1}{\hat{R}_{req}}} \quad 4)$$

The arrow of method 200 linking the bloc 250 to the bloc 210 illustrates the fact that the variable speed drive runs blocs 210-250 twice, being one for each of the two operating points to get the four equations.

As illustrated in bloc 260, the example method 200 comprises determining, by the variable speed drive, the refined estimated values of the stator resistance $\hat{R}'_s$, leakage inductance $\hat{L}'_f$, specific inductance $\hat{L}'$ and specific resistance $\hat{R}'_{req}$. The refined estimated values of the motor parameters ($\hat{R}'_s$, $\hat{L}'_f$, $\hat{L}'$, $\hat{R}'_{req}$) are determined based on the set of operating coefficients determined at each operating point and on the third and fourth equations. By solving the system above based on the operating coefficients and on the representation model, the variable speed drive is in a position to determine the refined estimated values of the stator resistance $\hat{R}'_s$, leakage inductance $\hat{L}'_f$, specific inductance $\hat{L}'$ and specific resistance $\hat{R}'_{req}$. In some examples, a matrix can be used to determine the refined estimated values of the motor parameters:

$$\begin{pmatrix} q1_{Rs} & q1_{Lf} & q1_L & 0 \\ r1_{Rs} & r1_{Lf} & 0 & r1_{Rreq} \\ q2_{Rs} & q2_{Lf} & q2_L & 0 \\ r2_{Rs} & r2_{Lf} & 0 & r2_{Rreq} \end{pmatrix} \begin{pmatrix} w \\ x \\ y \\ z \end{pmatrix} = \begin{pmatrix} Q_1 \\ R_1 \\ Q_2 \\ R_2 \end{pmatrix}$$

where w corresponds to $$\frac{\delta R_s}{\hat{R}_s} = \frac{\hat{R}_s - R_s}{\hat{R}_s},$$

x corresponds to $$\frac{\delta L_f}{\hat{L}_f} = \frac{\hat{L}_f - L_f}{\hat{L}_f},$$

y corresponds to $$\frac{\delta \frac{1}{L}}{\frac{1}{\hat{L}}} = \frac{\frac{1}{\hat{L}} - \frac{1}{L}}{\frac{1}{\hat{L}}}$$

and,
z corresponds to $$\frac{\delta \frac{1}{R_{req}}}{\frac{1}{\hat{R}_{req}}} = \frac{\frac{1}{\hat{R}_{req}} - \frac{1}{R_{req}}}{\frac{1}{\hat{R}_{req}}}.$$

The variable speed drive can therefore determine the refined estimated values of the stator resistance $\hat{R}'_s$, leakage inductance $\hat{L}'_f$, specific inductance $\hat{L}'$ and specific resistance $\hat{R}'_{req}$ as being equal to the real values of the stator resistance $R_s$, leakage inductance $L_f$, specific inductance L and specific resistance $R_{req}$, for example based on a matrix inversion, and by computing w, x, y and z.

The representation model of the electric motor of example method 200 requires two operating points to determine the refined estimated values of the stator resistance $\hat{R}'_s$, leakage inductance $\hat{L}'_f$, specific inductance $\hat{L}'$ and specific resistance $\hat{R}'_{req}$ but it is possible to have more than two operating points, for example n operating points (with n>2) and obtaining a system with 2 n equations for four values ($\hat{R}'_s$, $\hat{L}'_f$, $\hat{L}'$, $\hat{R}'_{req}$) to be determined. In other words, to determine the refined estimated values of the stator resistance $\hat{R}'_s$, leakage inductance $\hat{L}'_f$, specific inductance $\hat{L}'$ and specific resistance $\hat{R}'_{req}$ the example method 200 requires at least two operating points. As presented above for the example method 100, in cases of 2 n equation for four refined estimated values, the variable speed drive may determine the refined estimated values based on a recursive least-squares algorithm or based on a linear regression model.

As illustrated in bloc 270, the example method 200 comprises determining, by the variable speed drive, four values of the set of VSD parameters Svp3 based on the refined estimated values of the stator resistance $\hat{R}'_s$, leakage inductance $\hat{L}'_f$, specific inductance $\hat{L}'$ and specific resistance $\hat{R}'_{req}$. This bloc is illustrated in FIG. 5d. The refined estimated value of the leakage inductance $\hat{L}'_f$ of the motor parameters allows directly determining the leakage inductance $L_f$ of the set of VSD parameters. The refined estimated value of the stator resistance $\hat{R}'_s$ of the motor parameters allows directly determining the stator resistance $R_s$ of the set of VSD parameters. The refined estimated value of the specific inductance $\hat{L}'$ of the motor parameters allows indirectly determining the no-load current $I_v$ of the set of VSD parameters Svp3. The refined estimated values of the specific inductance $\hat{L}'$ and of the specific resistance $\hat{R}'_{req}$ allow indirectly determining the rotor time constant $T_r$. The example method 200 allows improving the control of an electric motor using a variable speed drive by determining values of a set of VSD parameters in closed loop. The values of the set of VSD parameters are determined based on the refined estimated values of the electrical parameters of the electric motor.

We just presented two examples allowing determining a set of VSD parameter with electrical parameters of the electric motor but we may have a similar determination using mechanical parameters. This is the object of example method 300 below.

Example Method 300

Figure 6:
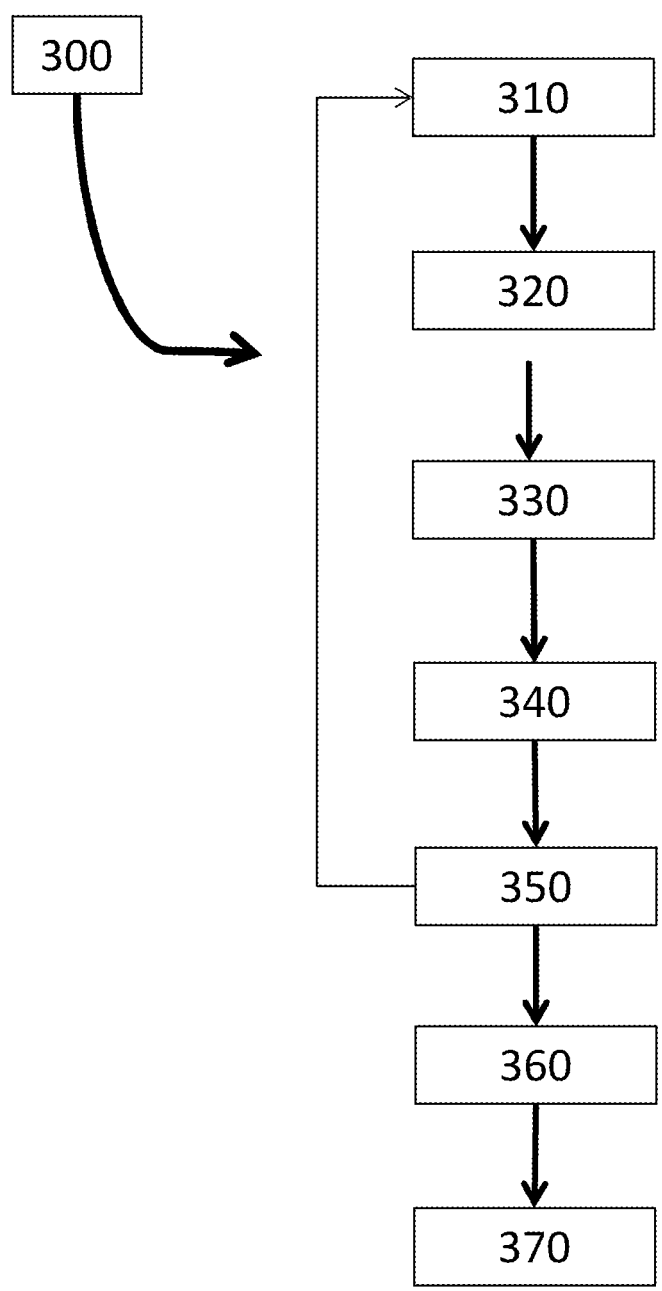
FIG. 6 illustrates a third example method.

An example method 300 is presented in reference with FIG. 6.

Figure 7A:
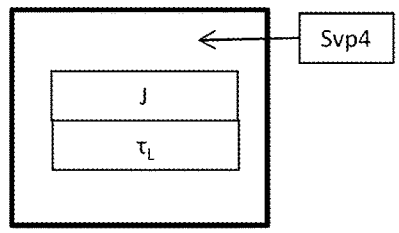
FIG. 7a illustrates a third example of a set of VSD parameters.

One of the goals of the example method 300 is to determine a set of VSD parameters Svp4 comprising two VSD parameters based on refined estimated values of at least two motor parameters of a representation model of example method 300. The two VSD parameters comprise a motor inertia J and a load torque $\tau_L$ of the electric motor. An example of a set of VSD parameters Svp4 of example method 300 is illustrated in FIG. 7a.

A first equation of the representation model of example method 300 which allows determining this set of VSD parameters Svp4 is:

$$\hat{J}\frac{d\omega}{dt} = \tau_{em} - \hat{\tau}_L$$

where:
$\hat{J}$ is an initial estimated value of a motor inertia of the electric motor and may be expressed in kilogram meter squared (kg·m$^2$) (the motor inertia being a motor parameter), $$\frac{d\omega}{dt}$$

is an operating coefficient and corresponds to an acceleration of the electric motor.

The acceleration may be expressed in meter per second squared (m·s$^{-2}$)

$\tau_{em}$ is an operating coefficient and corresponds to an electromagnetic torque of the electric motor. The electromagnetic torque may be expressed in Newton-metre (Nm), $\hat{\tau}_L$ is an initial estimated value of a load torque $\tau_L$ of the electric motor. The load torque may be expressed in Newton-metre (Nm).

In some examples, the motor inertia J may comprise a rotor inertia. In some examples, a motor inertia is a sum of different inertias in the electric motor.

The load torque $\tau_L$ of the electric motor may be equal to:

$\tau_L = K_0$, or $\tau_L = K_0 + K_1\omega_r$, or $\tau_L = K_0 + K_1\omega_r + \ldots + K_m\omega_r^m$, where:
$K_0, K_1, \ldots, K_m$ are load torque parameters and correspond to motor parameters of the electric motor, m being a natural integer and
$\omega_r$ corresponds to a rotor speed of the electric motor at an operating point.

Figure 7B:
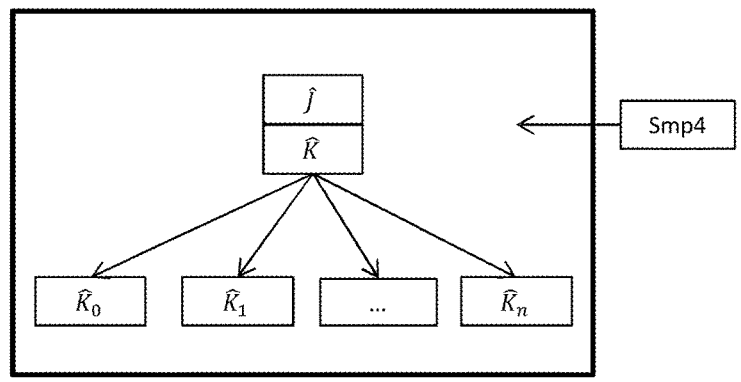
FIG. 7b illustrates a third example of a set of motor parameters of a representation model.

An example of a set of motor parameter Smp4 of example method 300 illustrating this embodiment is represented in FIG. 7b.

Figure 7C:
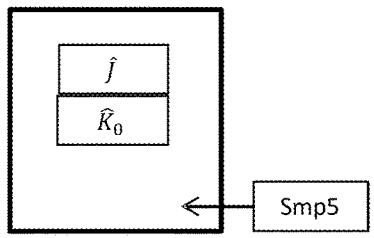
FIG. 7c illustrates a fourth example of a set of motor parameters of a representation model.

For the purpose of the example method 300, one may choose a load torque $\tau_L$ equal to the load torque parameter $K_0$. An example of a set of motor parameter Smp5 of example method 300 illustrating this embodiment is represented in FIG. 7c.

Hence, a second equation of the representation model of example method 300 which allows determining the set of VSD parameters Svp4 is:

$$\hat{J}\frac{d\omega}{dt} = \tau_{em} - \hat{K}_0$$

In the example method 300, one aims at determining the refined estimated value of the motor inertia $\hat{J}$ and the refined estimated value of the motor parameter $\hat{K}'_0$.

As illustrated in bloc 310, method 300 comprises applying, by the variable speed drive, an electric command to the electric motor such that the electric motor runs at two different operating points in succession.

As illustrated in bloc 320, the example method 300 comprises determining, by the variable speed drive, for each determined operating point, a real acceleration $$\frac{d\omega}{dt}$$

and a real electromagnetic torque $\tau_{em}$ of the electric motor based on measurements of the variable speed drive at the operating point. Both real acceleration $$\frac{d\omega}{dt}$$

and real electromagnetic torque $\tau_{em}$ allow determining a real operating parameter Opr of example method 300. In this case, the real operating parameter Opr comprises a real vector comprising the real acceleration $$\frac{d\omega}{dt}$$

and the real electromagnetic torque $\tau_{em}$. In some examples, a value of the real operating parameter Opr may be the norm of the real vector.

As illustrated in bloc 330, the example method 300 comprises determining, by the variable speed drive, for each determined operating point, an estimated acceleration $$\widehat{\frac{d\omega}{dt}}$$

and an estimated electromagnetic torque $\hat{\tau}_{em}$ of the electric motor based on the initial estimated values of motor inertia $\hat{J}$ and load torque parameter $\hat{K}_0$, on the second equation of the example method 300 and on the electric command applied to the electric motor to reach the determined operating point. Both estimated acceleration $$\widehat{\frac{d\omega}{dt}}$$

and estimated electromagnetic torque $\hat{\tau}_{em}$ allow determining an estimated operating parameter Ope of example method 300. In this case, the estimated operating parameter Ope comprises an estimated vector comprising the estimated acceleration $$\widehat{\frac{d\omega}{dt}}$$

and the estimated electromagnetic torque $\hat{\tau}_{em}$. In some examples, a value of the estimated operating parameter Ope may be the norm or magnitude of the estimated vector.

As illustrated in bloc 340, the example method 300 comprises computing, by the variable speed drive, for each determined operating point, an operating difference Opd based on the real operating parameter Opr and on the estimated operating parameter Ope. Here, the operating difference may correspond to a distance between a value of the estimated operating parameter Ope in the electric motor at an operating point and a value of the real operating parameter Opr obtained based on measurements of the variable speed drive at the operating point. In some examples, the operating difference Opd may correspond to a difference between the norm or magnitude of the estimated vector and the norm of the real vector. The operating difference Opd of example method 300 is associated to an operating point.

Figure 7D:
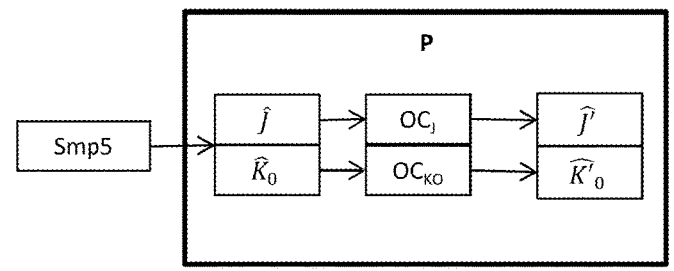
FIG. 7d illustrates a third example of equations of a representation model.

As illustrated in bloc 350, the example method 300 comprises determining, by the variable speed drive, for each determined operating point, a value of operating coefficients $OC_J$ and $OC_{K0}$ based on the operating difference Opd and on the representation model of the motor. An example of a representation model P of the electric motor of example method 300 comprising the operating coefficients $OC_J$ and $OC_{K0}$ is illustrated in FIG. 7d.

At this point, the variable speed drive has determined a set of operating coefficients for each operating point. In some examples, a set of operating coefficients for the first operating point may be ($OC1_J$, $OC1_{K0}$) and a set of operating coefficients for the second operating point may be ($OC2_J$, $OC2_{K0}$). Therefore, the variable speed drive has determined a system of two equations with two values to be determined (refined estimated values of motor inertia $\hat{J}$ and load torque parameter $\hat{K}_0$) that the variable speed drive is able to determine.

The arrow of method 300 linking the bloc 350 to the bloc 310 illustrates the fact that the variable speed drive runs twice through the blocs 310-350, being once for each of the two operating points to get the two equations. As for the previous example methods, the example method 300 may comprise more than two operating points, for example n operations points, with n being a natural integer greater than two (n>2), to obtain n equations with two refined estimated values to be determined. In such a case, the example method 300 may use a linear regression model as the recursive least-squares algorithm to determine the refined estimated values.

As illustrated in bloc 360, the example method 300 comprises determining, by the variable speed drive, the refined estimated values of motor inertia $\hat{J}'$ and load torque parameter $\hat{K}'_c$. The refined estimated values of the motor parameters ($\hat{J}'$ and $\hat{K}'_c$) are determined based on the set of operating coefficients determined at each operating point and on the representation model of the motor.

Figure 7E:
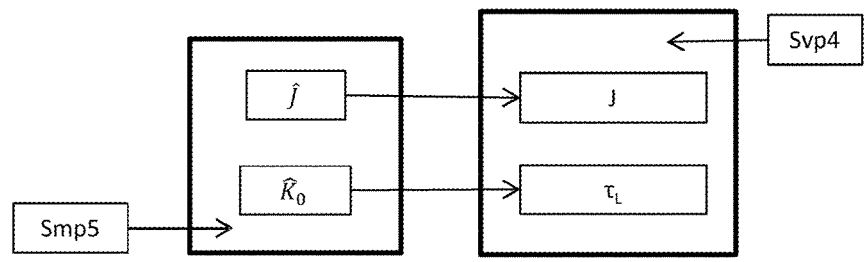
FIG. 7e illustrates a third example of a set of VSD parameters determined based on a set of motor parameters.

As illustrated in bloc 370, the example method 300 comprises determining, by the variable speed drive, two values of the set of VSD parameters Svp4 based on the refined estimated values of motor inertia $\hat{J}'$ and load torque parameter $\hat{K}'_c$. This bloc is illustrated in FIG. 7e. The refined estimated value of the motor inertia $\hat{J}'$ of the motor parameters allows directly determining the motor inertia J of the set of VSD parameters. The refined estimated value of the load torque parameter $\hat{K}'_c$ allows indirectly determining load torque $\tau_L$ of the electric motor of the set of VSD parameters Svp4.

It should be noted that the load torque $\tau_L$ may comprise several load torque parameters $K_0$, $K_1$, $K_2$, . . . , $K_m$ (corresponding to m+1 motor parameters, m being a natural integer) which means that the example method 300 may comprise at least m+2 operating points to determine the motor inertia J and the load torque $\tau_L$ of the set of VSD parameters Svp4 based on the second equation.

The example method 300 allows improving the control of an electric motor using a variable speed drive by determining values of a set of VSD parameters. The values of the set of VSD parameters are determined based on the refined estimated values of mechanical parameters of the electric motor.

The three example methods presented above comprise the same kind of blocs, the variation between the blocs depending on the chosen representation model of the motor. Actually, the example methods may be aggregated or generalized by a same general method 400 that is presented below in reference with FIG. 8.

Method 400

The method 400 is a method for controlling an electric motor using a variable speed drive. The variable speed drive may store a representation model of the electric motor. The representation model of the electric motor may comprise one or more initial estimated values of motor parameters $\widehat{mp}$ in a set of motor parameter Smp. An example of set of motor parameter Smp is illustrated in FIG. 9a and comprises two initial estimated values of motor parameters $\widehat{mp1}$ and $\widehat{mp2}$.

A motor parameter may be considered as a constant value during the execution of the methods presented hereby. A motor parameter is an inherent parameter of the electric motor. The value of a motor parameter may be independent of an operating point of the electric motor or may be independent of an electric command applied to the electric motor. That is, for two different operating points of the electric motor or for two different electric commands applied to the electric motor, the motor parameters may be considered constant.

A set of motor parameters may comprise electrical parameters or mechanical parameters as presented above or a combination of both electrical and mechanical parameters. In some examples, the electrical parameters may comprise:
 a stator inductance $L_s$ of the electric motor,
 a rotor inductance $L_r$ of the electric motor,
 a mutual inductance $L_m$ of the electric motor,
 a stator resistance $R_s$ of the electric motor,
 a rotor resistance $R_r$ of the electric motor,
 a specific inductance L of the electric motor,
 a leakage inductance $L_f$ of the electric motor,
 a specific resistance $R_{req}$ of the electric motor.
The different inductances may be expressed in Henry (H). The different resistances may be expressed in ohm (Ω).
In some examples, the mechanical parameters may comprise:
 a motor inertia J of the electric motor, the motor inertia may be expressed in kilogram meter squared (kg·m$^2$),
 load parameters $K_0, K_1, \ldots K_m$ of a load torque $\tau_L$ of the electric motor, the load torque may be expressed in Newton-metre (Nm).

A representation model of the electric motor may be established based on a set of default parameters of the electric motor. By establishing a representation model, it should be understood in the present disclosure that initial estimated values of the motor parameters of the representation model at an initial stage may be estimated based on a set of default parameters. In other words, initializing the initial estimated values of motor parameters of the set of motor parameters may be based on a set of default parameters of the electric motor. The set of default parameters may comprise a value of a nameplate of the electric motor. In some examples, the set of default parameters may comprise one or more of a nominal voltage, a nominal current, a nominal frequency, a nominal speed, a power factor, a nominal power, or a full-load speed. As said above, one of the goals of the methods presented hereby is to determine refined estimated values of motor parameters of the representation model and using it to determine a set of VSD parameters in order to improve the control of the electric motor by the variable speed drive. In this context, initializing initial estimated values of the motor parameters based on a set of default parameters may increase the precision of the determination of the VSD parameters using less operating points since initial estimated values of the motor parameters (in this case the default parameter) will be closer to the refined estimated values determined by the methods than, for example, random parameter values.

As illustrated in bloc 410, the method 400 may comprise applying, by the variable speed drive, one or more electric command to the electric motor such that the electric motor runs at one or more determined operating point.

As we understand from the above example methods, a number of operating points depends on a representation model of the electric motor. In some examples, in a representation model comprising two motor parameters and one equation, the method 400 may comprise applying two different electric commands to reach two different determined operating points to determine the refined estimated value of both motor parameters.

As illustrated in bloc 420, the method 400 may comprise determining, by the variable speed drive, for each determined operating point, a real operating parameter Opr in the electric motor, based on measurements of the variable speed drive at the operating point.

Real Operating Parameter

A real operating parameter Opr is a parameter linked to an estimated operating parameter Ope.

A value of the real operating parameter Opr, at a determined operating point, is dependent on the real values mp of the motor parameters and on the determined operating point. The real operating parameter Opr, at a determined operating point, may be estimated based on measurements of the variable speed drive at the determined operating point.

The real operating parameter Opr represents a real response of the electric motor at a determined operating point.

In some examples, a value of a real operating parameter of the representation model may be determined based on a real current I of the electric motor corresponding to a current of the electric motor at an operating point and determined based on measurements of currents in the electric motor by the variable speed drive. In some examples, the real current I may be a vector corresponding to a real current $I_{dq}$ in the Park coordinate system.

In some examples, a value of a real operating parameter of the representation model may be determined based on a rotor speed (or of the electric motor corresponding to a speed of the electric motor at an operating point, the rotor speed (or being determined by the variable speed drive based on angular positions of the electric motor at the operating point.

In some examples, a value of a real operating parameter of the representation model may be determined based on a real electromagnetic torque $\tau_{em}$ of the electric motor corresponding to an electromagnetic torque of the electric motor at an operating point determined by the variable speed drive based on measurements of the variable speed drive at the operating point.

In some examples, a value of a real operating parameter may be estimated based on an acceleration $$\frac{d\omega}{dt}$$

of the electric motor at an operating point. The acceleration may be determined based on rotor speed (or measurements of the electric motor at said operating point.

In some examples, the real operating parameter Opr may be a real vector (real as in based on measurements or determinations of the VSD) comprising several real values of the electric motor dependent on the operating point. In some examples, a value of the real operating parameter Opr may be a norm or magnitude of the real vector comprising the several real values of the electric motor at an operating point.

As illustrated in bloc 430, the method 400 may comprise determining, by the variable speed drive, for each determined operating point, an estimated operating parameter in the electric motor based on estimated values of motor parameters of a representation model of the electric motor and on the electric command associated to the operating point.

Estimated Operating Parameter

An estimated operating parameter Ope depends on the electric command applied to the electric motor to reach an operating point and on the initial estimated values $\widehat{mp}$ of the motor parameters of the representation model. The estimated operating parameter Ope represents a theoretical response of the electric motor at a determined operating point.

As said above, the estimated operating parameter Ope is a parameter linked to the real operating parameter Opr. It should be understood here by "linked" that the estimated operating parameter Ope and the real operating parameter comprise the same type of values, or values representing a same physical dimension.

In some examples, the estimated operating parameter may be an estimated vector comprising several estimated values as an estimated rotor speed $\hat{\omega}_r$, an estimated current $\hat{I}$, an estimated electromagnetic torque $\hat{\tau}_{em}$ and an estimated acceleration $$\frac{\widehat{d\omega}}{dt}$$

determined for the operating point. In some examples, the estimated current $\hat{I}$ may be a vector corresponding to an estimated current $\hat{I}_{dq}$ in the Park coordinate system.

In some examples, the value of the estimated operating parameter Ope may be a norm or magnitude of the estimated vector comprising the several estimated values of the motor parameters determined for the operating point.

As illustrated in bloc 440, the method 400 may comprise computing, for each determined operating point, an operating difference Opd based on the real operating parameter Opr and on the estimated operating parameter Ope.

Operating Difference

An operating difference Opd is a difference between the estimated operating parameter and the real operating parameter (Opd=Ope−Opr) at a determined operating point. The operating difference may therefore characterize the difference between the initial estimated values $\widehat{mp}$ of the set of motor parameters Smp of the representation model and the real values mp of the motor parameters. Hence, the more accurate the initial estimated values $\widehat{mp}$ of motor parameters of the representation model are (i.e close to the real values mp), the lower the absolute value of the operating difference is.

The refined estimated values $\widehat{mp}'$ of the motor parameters may therefore be found by minimizing the operating difference Opd for different operating points of the electric motor. Minimizing the operating difference comprises modifying the initial estimated values $\widehat{mp}$ of the motor parameters of the set of motor parameters.

In the case where the estimated operating parameter Ope and the real operating parameter Opr respectively are an estimated vector and a real vector, the operating difference may be a distance between the estimated vector and the real vector. In some examples, the operating difference may be a difference between the norms or magnitudes of the estimated and real vectors.

As illustrated in bloc 450, the method 400 may comprise determining, by the variable speed drive, for each determined operating point, a value of at least one operating coefficient, based on the operating difference Opd and on the representation model of the motor. The number of operating coefficients depends on the number of motor parameters of the representation model and on the number of equations of the representation model.

Operating Coefficients

An operating coefficient may be associated to a motor parameter of the representation model and/or to an operating point. An operating coefficient Oc may represent a link between the initial estimated value of a motor parameter $\widehat{mp}$ and the real value of the motor parameter mp in the representation model. An example illustrating this link is illustrated in FIG. 9*b*. The estimated value $\widehat{mp1}$ and the real value mp1 of the motor parameter mp1 are linked to the operating coefficient Oc1 while the estimated value $\widehat{mp2}$ and the real value mp2 of the motor parameter mp2 are linked to the operating coefficient Oc2 as represented by the arrows.

A value of an operating coefficient Oc depends on the operating point of the electric motor and on the representation model. The value of each operating coefficient Oc, at a determined operating point, may be estimated based on the initial estimated values $\widehat{mp}$ of the motor parameters, on the estimated operating parameter Ope and on the real operating parameter Opr.

The arrow of method 400 linking the bloc 450 to the bloc 410 illustrates the fact that the variable speed drive run at least once through the blocs 410-450 to determine the at least one operating coefficient associated to each of the at least one determined operating point.

As illustrated in bloc 460, the method 400 may comprise determining, by the variable speed drive, a refined estimated value of at least one motor parameter of the representation model based on the at least one operating coefficient Oc determined at each operating point and on the representation model. The at least one motor parameter corresponds to the motor parameter linked to the at least one operating coefficient. As presented above in the example methods, the at least one motor parameter also depends on the representation model of the motor. Determining the refined estimated values may for example be based on solving a system or may be based on a linear regression model as the recursive least-squares algorithm.

As illustrated in bloc 470, the method 400 may comprise determining, by the variable speed drive, values of a set of VSD parameters based on the refined estimated value of the at least one motor parameter, the set of VSD parameters comprising at least two VSD parameters.

VSD Parameters

A VSD parameter should be understood in this disclosure as an input parameter of the variable speed drive for controlling the electric motor. The VSD parameters correspond to parameters of the electric motor. In some examples, the VSD parameters may comprise electrical or mechanical parameters.

Determining a precise set of VSD parameters allows improving the control of the electric motor by the variable speed drive.

In some examples, a set of VSD parameters may comprise a stator resistance $R_s$, a no-load current $I_v$, a leakage inductance $L_f$, a rotor time constant $T_r$, a load torque $\tau_L$ and a motor inertia J of the electric motor.

As presented above, values of the set of VSD parameters may be determined directly or indirectly based on the motor parameters of the representation model.

By directly determining, we mean here that the value of the VSD parameter is directly equal to the refined estimated value of the motor parameter of the set of motor parameter Smp of the representation model. By indirectly determining, we mean here that the value of the VSD parameter may be determined based on the refined estimated value of the motor parameter.

An example of set of VSD parameter obtained based on the refined estimated values of the motor parameters $\overline{mp1'}$ and $\overline{mp2'}$ is illustrated in FIG. 9c. A VSD parameter VSD1 is directly obtained based on the real value of the motor parameter mp1. A VSD parameter is indirectly obtained based on the real values of the motor parameters mp1 and mp2.

The determined set of VSD parameters may comprise at least two of a stator resistance $R_s$, a no-load current $I_v$, a leakage inductance $L_f$, a rotor time constant $T_r$, a load torque $\tau_L$ and a motor inertia J.

The method 400 allows computing, in real time, a set of VSD parameters adapted to each electric motor. The set of VSD parameters, as inputs of the variable speed drive controlling the electric motor, improves in an adapted way the control of the electric motor since the VSD parameters are determined based on refined estimated values of the motor parameters of each electric motor.

The method 400 may further comprise an updating of the representation model of the electric motor based on the determined refined estimated value of the at least one motor parameter. By updating the representation model of the electric motor, it should be understood in the present disclosure that the determined refined estimated value associated to the at least one motor parameter replaces the initial estimated value of the at least one motor parameter in the representation model. This allows refining the representation model of the electric motor in real time. The control of the electric motor by the variable speed drive is therefore improved during the life of the electric motor at each iteration of the method.

It should be noted that the refined estimated value of a motor parameter replacing an initial estimated value of a motor parameter in the representation model becomes an initial estimated value of the motor parameter of the representation model for the purpose of a new iteration of the method 400. This initial estimated value (previously refined estimated value of the previous iteration) will be closer to a new refined estimated value determined by a new iteration of the method 400.

The method 400 may further comprise:
storing the values of the at least one operating coefficient into the variable speed drive when a distance between the at least one operating coefficient and previously stored at least one operating coefficient is above a determined threshold.

The method 400 allows determining the refined estimated values of the motor parameters of the representation model of the electric motor by obtaining a system of equations representing a difference between a theoretical response of the electric motor and a real response of the electric motor for the different operating points. Hence, determining operating coefficients attached to an operating point close to previously stored operating coefficients attached to another operating point means having two similar equations which would render the determination of the refined estimated values of the motor parameters less accurate.

Then, when a distance is above a determined threshold, the value of the at least one operating coefficient may be used to determine the refined estimated values of the motor parameters of the representation model and may be stored into the variable speed drive with the determined operating point. In some examples, when the distance is below a determined threshold, the value of the at least one operating coefficients is not used in the determining of the refined estimated values of the motor parameters and the electric command may be modified to reach another determined operating point.

The method 400 may also comprise advising an operator of the electric motor of operating points to determine the set of VSD parameters by executing the method 400. In some examples, the method 400 may advise the operator to choose an electric command to reach a first determined operating point with a low speed and a full charge and to reach a second operating point with a high speed and a low charge.

The method 400 may also comprise, previously to bloc 450, a bloc 445 of determining a performance value of the representation model. By performance value, it should be understood in the present disclosure a value characterizing a performance of the electric motor based on an electric command and on the initial estimated values of the motor parameters. The performance value may be expressed by a percentage. In some examples, the performance value may be determined based on an absolute value of the operating difference (|Opd|) at an operating point characterizing the motor parametrical error and on a value of the electric command.

In some examples, the method 400 may comprise continuing the execution of the method 400 when the performance value is below a determined threshold expressed in percentage. In some examples, the determined threshold may be comprised between 80 and 95% and may be preferably equal to 90%. In some examples, when the performance value is above a determined threshold, the method 400 may comprise stopping its execution and, in some cases, alerting an operator that the control of the electric motor by the variable speed drive is as precise as desired.

The method 400 may also comprise controlling the electric motor based on a set of stored VSD parameters. The set of stored VSD parameters may be stored in a memory of the variable speed drive. The set of stored VSD parameters may be updated at each iteration of the method 400 based on the determined set of VSD parameters comprising the at least two VSD parameters in order to refine the set of stored VSD parameters at each iteration.

A type may also be assigned to the electric motor. The type may for example comprise a range of the electric motor, a manufacturing year, a production site. The method 400 may therefore comprise storing an electric motor dataset comprising the determined set of VSD parameters, the type of the electric motor and a running time of the electric motor. The running time may be expressed in operating hours. In some examples, statistics may be collected on numerous electric motors depending on the type of each electric motor and on their running time.

The present disclosure also presents a method for processing data of electric motors, wherein the data comprises a plurality of electric motor datasets. Each dataset may be associated to an electric motor and comprises a type of the electric motor, a set of VSD parameters of the electric motor, and a running time of the electric motor. The plurality of dataset may be obtained according to an embodiment of the method 400 when it is executed on a plurality of electric motors.

The method for processing data of electric motors may comprise:
classifying the electric motors, based on an evolution of their set of VSD parameters during running time; and/or
determining, for a specific type of electric motor, a predicted set of VSD parameters at a determined running time, based on several datasets of electric motors comprising the specific type.

Classifying the electric motors based on an evolution of their set of VSD parameters over time may for example allow identifying some production lines associated to a VSD parameters evolution of electric motors not faring as well as other production lines and therefore identifying some potential issues on such productions lines.

Determining a predicted set of VSD parameters at a determined running time may for example allow setting an accurate set of VSD parameters for an electric motor driven by a variable speed drive which may not have access to the methods presented hereby. In such a case, one may directly set accurate VSD parameters to an electric motor based on its specific type and on its running time.

The invention claimed is:

1. A method for controlling an electric motor using a variable speed drive, the method comprising:
applying, by the variable speed drive, one or more electric command to the electric motor such that the electric motor runs at one or more determined operating point;
determining, by the variable speed drive, for each determined operating point, a real operating parameter in the electric motor, based on measurements of the variable speed drive at the operating point;
determining, by the variable speed drive, for each determined operating point, an estimated operating parameter in the electric motor based on initial estimated values of motor parameters of a representation model of the electric motor and on the electric command associated to the operating point;
computing, for each determined operating point, an operating difference based on the real operating parameter and on the estimated operating parameter,
determining, by the variable speed drive, for each determined operating point, a value of at least one operating coefficient, based on the operating difference and on the representation model of the electric motor;
determining, by the variable speed drive, a refined estimated value of at least one motor parameter of the representation model based on the at least one operating coefficient determined at each operating point and on the representation model; and
determining, by the variable speed drive, values of a set of VSD parameters based on the refined estimated value of the at least one motor parameter, the set of VSD parameters comprising at least two VSD parameters.

2. The method according to claim 1, wherein the representation model comprises electrical or mechanical parameters of the electric motor.

3. The method according to claim 1, wherein the representation model is established based on a set of default parameters of the electric motor.

4. The method according to claim 3 wherein the set of default parameters comprises a parameter of a nameplate of the electric motor.

5. The method according to claim 1, wherein the method further comprises :
updating the representation model based on the refined estimated value of the at least one motor parameter determined.

6. The method according to claim 1, wherein the method further comprises:
storing the values of the at least one operating coefficient into the variable speed drive when a distance between the at least one operating coefficient and a previously stored at least one operating coefficient is above a determined threshold.

7. The method according to claim 1, wherein the estimated operating parameter and the real operating parameter are respectively an estimated vector and a real vector comprising several values and the operating difference corresponds to a difference between the norms of the estimated and real vectors.

8. The method according to claim 1, the method further comprising determining a performance value of the representation model based on the values of an electric command and on an operating difference determined at an operating point.

9. The method according to the above claim 8, the method comprising continuing the execution of the method when the performance value is below a determined threshold.

10. The method according to any of claims claim 1, the method further comprising controlling, by the variable speed drive, the electric motor based on a set of stored VSD parameters.

11. The method according to claim 1, wherein the set of VSD parameters comprises at least two of a stator resistance, a no-load current, a leakage inductance, a rotor time constant, a load torque and a motor inertia.

12. The method according to claim 1, wherein a type is assigned to the electric motor and wherein the method further comprises storing, in a remote server, an electric motor dataset comprising the determined set of VSD parameters, the type of the electric motor and a running time of the electric motor.

13. A method for processing data of electric motors, wherein the data comprises a plurality of electric motor datasets, each dataset being associated to an electric motor and comprising a type of the electric motor, a set of VSD parameters of the electric motor, and a running time of the electric motor, the plurality of dataset being obtained according to the method of claim 12, the method comprising :

> classifying, the electric motors, based on an evolution of their set of VSD parameters during running time; and/or determining, for a specific type of electric motor, a predicted set of VSD parameters at a determined running time, based on several datasets of electric motors comprising the specific type.

14. A non-transitory computer-readable storage medium comprising instructions which, when executed by a processor, cause the processor to carry out the method of claim 1.

15. A variable speed drive comprising a processor adapted to control an electric motor according to the method of claim 1.

* * * * *